United States Patent [19]

Stamm et al.

[11] Patent Number: 5,176,580
[45] Date of Patent: Jan. 5, 1993

[54] BELT TENSIONER FOR INTERNAL COMBUSTION ENGINE

[75] Inventors: Philippe Stamm, Decize; Alaine Vaxelaire, Romagnat, both of France

[73] Assignee: Caoutchouc Manufacture et Plastiques, Versailles, France

[21] Appl. No.: 775,199

[22] Filed: Oct. 11, 1991

[30] Foreign Application Priority Data

Oct. 16, 1990 [FR] France .................. 90 12871

[51] Int. Cl.⁵ ............................. F16H 7/08
[52] U.S. Cl. .................... 474/101; 474/133
[58] Field of Search ........ 474/101, 109, 111, 113–117, 474/133–136; 123/90.31

[56] References Cited

U.S. PATENT DOCUMENTS

| 2,152,038 | 3/1939 | Gettys | 474/133 X |
| 2,466,495 | 4/1949 | Slenmons | 474/133 X |
| 3,158,256 | 11/1964 | Torrey et al. | 198/220 |
| 3,975,965 | 8/1976 | Speer | 74/242.11 |
| 4,144,772 | 3/1979 | Brackin et al. | 474/135 |
| 4,472,162 | 9/1984 | Hitchcock | 474/135 |
| 4,571,223 | 2/1986 | Molloy | 474/133 |
| 4,702,727 | 10/1987 | Dahm | 474/101 |

FOREIGN PATENT DOCUMENTS

| 0335642 | 10/1989 | European Pat. Off. |
| 2430704 | 1/1976 | Fed. Rep. of Germany |
| 3637212 | 5/1988 | Fed. Rep. of Germany |
| 2104394 | 4/1972 | France |
| 2540954 | 2/1984 | France |
| 0243237 | 10/1987 | France |
| 0281432 | 9/1988 | France |
| 1013701 | 12/1965 | United Kingdom |
| 1028884 | 5/1966 | United Kingdom |
| 2027514 | 2/1980 | United Kingdom |

Primary Examiner—Thuy M. Bui
Attorney, Agent, or Firm—Nils H. Ljungman and Associates

[57] ABSTRACT

An internal combustion engine having a power generating device, and a transmission link connecting the power generating device to an accessory operated by the power generating device, the transmission link being tensioned by a tension adjusting device which elastically presses a tension pulley against the flexible transmission link by the electric deformability of a deformable parallelepiped solid constituted by a pair of elements formed of composite flexible strips held parallel, and separated, by the permanent fixing of their extremities in a bearing holder block and in an adjustable fastener, the flexible strips possibly supporting a means to modify the flexibility of the elastic tension device which may include a means to damp the vibrations of the flexible link.

23 Claims, 11 Drawing Sheets

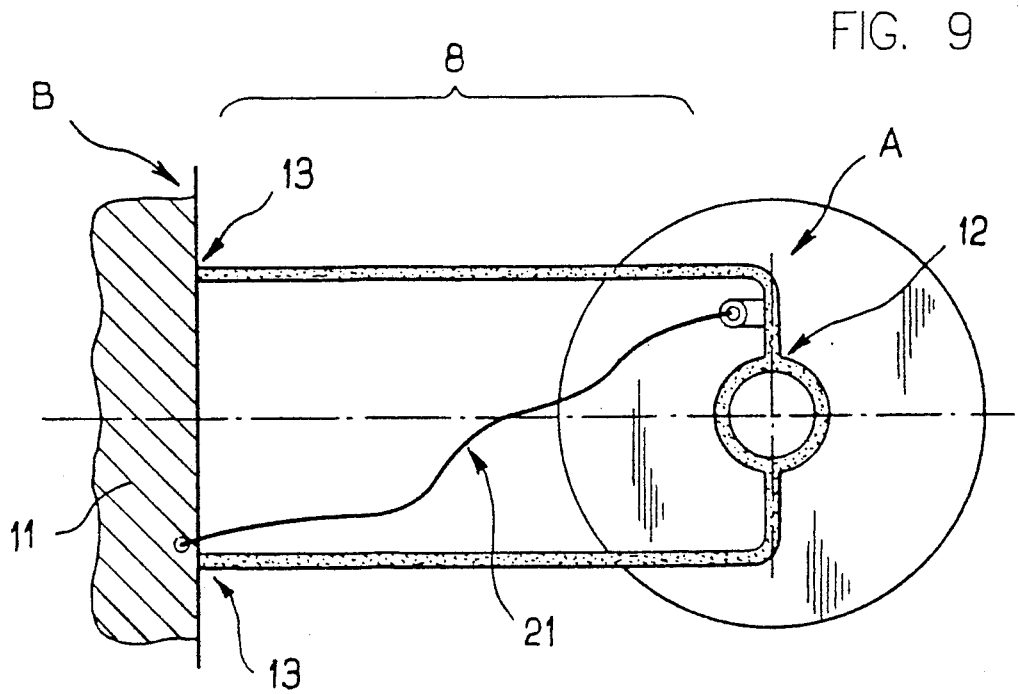
FIG. 9
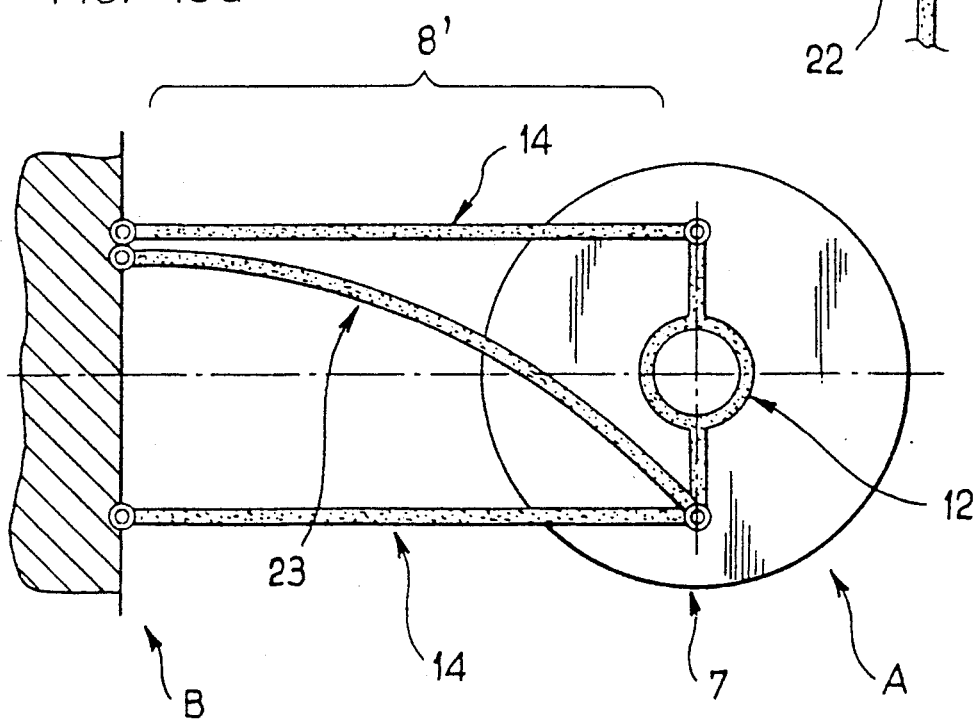
FIG. 10a
FIG. 10b

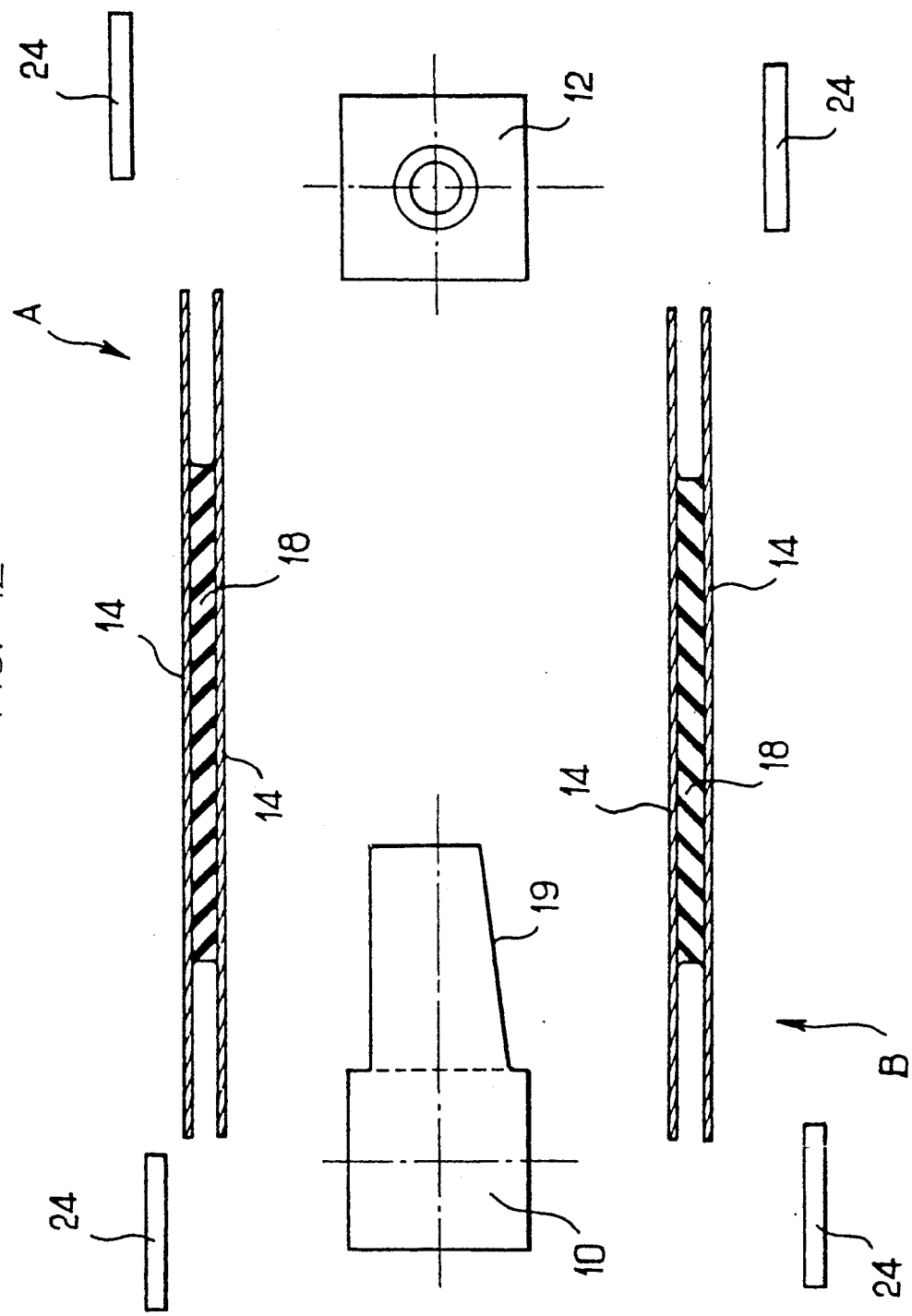

BELT TENSIONER FOR INTERNAL COMBUSTION ENGINE

BACKGROUND OF THE INVENTION

1. Field of the Invention

This invention relates to internal combustion engines which employ flexible link transmissions, such as belts. The belts rely on mechanical adherence, or friction, to drive a pulley. Such a belt operates driven devices which receive mechanical power via the belt which is driven by the internal combustion engine. The belts are used, more specifically, to drive accessories on automobile engines. The belts must be placed under a specific amount of tension for proper operation, and this tension may be applied by a roller positioned at the end of a movable lever arm. The lever arm is generally a part of a tensioning device which receives an elastic torque that can be provided by biasing means. The tensioning device elastically presses the roller, or a pulley against the flexible link, which may be a flat, trapezoidal or multi-ribbed belt.

2. Background Information

Flexible link transmissions which operate by mechanical adherence of a flexible link to pulleys, require an elastic tensioning means to make possible the mechanical adherence of the flexible link to the pulleys. This is essentially true whether the driving surface of the flexible link is flat, trapezoidal or grooved. Such a flexible link is commonly called a "belt", and these belts are generally made of cabled materials having high rigidity, such as polyester, glass fiber or aramid.

Such flexible links, or belts are used on automobiles, or stationary engines to drive accessories, such as water pumps, alternators, air conditioners, power steering pumps, etc. These accessories are positively driven by the flexible link which connects the accessories to a driven shaft of the engine. The adherence of the belt to the pulleys of the driven accessories and to the driven shaft is generally maintained by a tensioning device which utilizes an idler pulley.

The tensioning devices of flexible transmission links of the prior art exert an elastic thrust on the transmission belts which operate by mechanical adherence, or on the chain of a transmission. This elastic thrust is generally exerted by means of a movable idler pulley supported in general by an oscillating arm on which an elastic recall torque is exerted by a spring. In chain or positive drive devices, e.g. a so-called synchronized flexible belt, the device called the tensioning roller is generally blocked, after adjustment, to prevent dynamic pulsations in the strands of the flexible link between the pulleys.

The same is essentially true, for other reasons, in flexible link transmissions such as trapezoidal belts, when the elasticity of the flexible armature is used to provide an appropriate elastic tension between pulleys with a fixed center-to-center distance, as disclosed in European Patent No. 0,281,432 (Hutchinson).

The term "idler pulley", which is now in common usage, is applied, strictly speaking, to the recent generation of so-called multi-ribbed flexible belts, which are frequently used in the automobile industry. For these multi-ribbed belt systems, mechanical adherence is achieved by a plurality of inclined surfaces on the ribbed throats of the pulleys. The very high longitudinal rigidity of the flexible, textile reinforcement armature is advantageously offset by an elastic force exerted by a spring which applies a torque to the arm supporting the idler pulley. It is this spring that is deflected when there are dynamic variations of the tension.

In a first family of such idler pulleys, a bearing, which supports the shaft of the lever, receives an elastic torque from a metal spring. The metal spring, generally called a torsion spring which can be either a coil or a spiral spring, makes possible a high degree of flexibility, thus guaranteeing the application of an essentially constant force in spite of the dynamic variations, as disclosed in French Patent No. 2,509,408 (Litens Automotive) or U.S. Pat. No. 4,472,162 (Dyneer Corporation). The high degree of flexibility achieved by the above combinations results in a need to seek a damping of the dynamic movements by the friction of rubber rings. The rubber rings described are cylindrical in the former document and conical in the latter. The problems encountered in developing such a system generally arise due to the definition of a surface friction of rubber against metal during the life of an automobile.

European Patent No. 0,013,704 (Boge) discloses a device which belongs to the above-mentioned family by the utilization of a metal leaf spring which is coiled into a spiral. The device of European Patent No. 0,013,704 is also related to the following family of idler pulleys on account of the adherance of an elastomeric damper to the coiled spring.

A second family of idler pulley devices overcomes the risks of friction by exerting the elastic torque by the rubber itself, which is adherized to metal rings.

U.S. Pat. Nos. 3,975,965 (Dayco Corporation), 4,144,772 (The Toro Company), Great Britain Patent No. 2,070,727 (Alan Crosley Pritchard), and European Patent No. 0,157,193 (RIV-SKF) describe this type of device. The first, U.S. Pat. No. 3,975,965, proposes an improvement of the connection with the shaft by means of fin-like projections which increase the contact surface between the shaft and the elastomer. The remaining three patents propose improvements by using a square shaft. In each of these four cases, the rotation of the arm supporting the pulley takes place by deformation of the elastomer. Although the flexibility of the elastomer makes possible the torsional flexibility required by the tensioning device, it also results in imprecise guidance in the plane of the arm, which is not without certain disadvantages, in particular with regard to vibrations.

The damping of pulsation phenomena also results from the visco-elasticity of the material. This damping is frequently insufficient for certain resonant conditions of the engine. Thus, complex means have been developed to remedy the problem, such as a band brake, controlled electronically, as disclosed in U.S. Pat. No. 4,702,727 (Daimler-Benz), or a viscous fluid damping, as disclosed in PCT application No. WO 84/01415 (Dayco Corporation).

Non-torsional springs can also be used on a tipping device by rotation on a bearing, such as the elastic strap combined with a variable friction cam effect as disclosed in U.S. Pat. No. 4,571,223 (General Motors), or even a spring with a rectilinear coil embedded in an elastomer sheath which forms a chamber for a damping liquid as proposed in European Patent No. 0,243,237 (Hutchinson). French Patent No. 2,540,954 (Porsche) discloses, in addition to a stack of conical washers forming a rectilinear spring, an electrical control of the tension.

Such sophisticated measures, added to what was initially a very simple elastic tensioning system, are proof that the problem of maintaining the tension of the flexible link cannot be solved by means of only a simple spring. The experience of manufacturers of idler pulleys shows that the dynamic problems of resonance under certain engine conditions are extremely difficult to solve by the simple addition of exterior, visco-elastic or friction damping.

An analysis of the prior art shows that apparently, it does not include a simple, and economical elastic tensioning device for flexible link transmissions, which device includes an integrated means for damping the dynamic variations of tension, which damping, since it does not employ any friction element, minimizes the risks of variation over time and premature wear, and which device makes possible a simple regulation of a constant tension.

OBJECT OF THE INVENTION

The object of the present invention is therefore to provide an internal combustion engine which has a simple and compact tensioning device for solving the problem of the tension of the belt, or of any flexible link in general, by applying to the bearing of the idler pulley an elastic force by means of a deformable part, which deformable part also performs other functions of guidance and possibly damping of vibrations of the flexible link.

SUMMARY OF THE INVENTION

To accomplish this object, the invention takes advantage of the elastic deformability of a parallelepiped solid, which solid can preferably consist of a composite, multi-layer assembly of elastomer compounds and metal or plastic thin sheets, or composite flexible strips in a polymer, thermoplastic or thermosetting matrix, reinforced by long fibers oriented monodirectionally.

In a preferred application, the modulus of elasticity which can be provided by the traction-compression of the composite material in these flexible strips can be significantly lower than the modulus of elasticity which can be provided by metal springs which can be used in this type of application. The modulus of elasticity of the composite material also makes possible a specific arrangement of multiple parallel strips, fixed at both of their extremities. The geometry of this multiple parallel arrangement makes it possible to integrate into the device a visco-elastic damping by using composite flexible strips, made of a composite material, with an elastic compound to which the strips may or may not be adherized. This combination of elastomer and composite strips generally results in an increase in efficiency, making possible a prestressing of the elastomer compound independently of the adjustment of the force acting on the elastic tension of the flexible link. Such prestressing of the elastomer can preferably be regulated during assembly of the tensioning device.

The invention essentially consists of a tensioning device which elastically presses a pulley against a flexible transmission link operating by mechanical adherence. Such a tensioning device will preferably have a spring, and may also preferably include a damping means.

The invention is characterized by the fact that the pressure on the flexible link is exerted by the elastic deformability of a deformable, parallelepiped solid constituting the spring, and the major sides of which can preferably be formed by a pair of composite flexible strips in a parallel and spaced apart arrangement. The composite strips can preferably be maintained in the parallel and spaced apart arrangement by the fastening of their extremities either in a fastening device which surrounds a bearing holder block at the mobile extremity supporting an idler pulley, or in the adjustable fastening device of the fixed extremity, which adjustable fastening device is for being fixed onto the engine crankcase. The fixed extremity can possibly encompass a means to modify the flexibility of the elastic tensioning device over at least a portion of the elastic travel of the device.

In certain variants, the composite flexible strips can preferably be assembled about a damping layer, or layers of an elastomer compound, thereby forming a sandwich and guaranteeing the visco-elastic damping of the elastic tension device.

The deformable parallelepiped solid, depending on the variant, can have, as its major surfaces, any of the following combinations:

by a pair of composite flexible strips;

by a pair of two pairs of composite flexible strips;

by a pair of composite flexible strips, one of whose elements can consist of a pair of composite flexible strips, the other element of the pair being a single composite flexible strip;

by a pair of two sets of flexible strips, at least one of which sets consists of three composite flexible strips;

one of the preceding arrangements, into which is integrated a means to dampen the vibrations of the flexible link, the means to dampen possibly being made from an elastomer block which occupies all or at least a part of the section provided between the composite flexible strips which are to surround the dampening means;

one of the preceding arrangements, where the number of composite flexible strips of one of the pairs is at least equal to two, and between which two strips is inserted at least one layer of a damping elastomer compound;

one of the preceding arrangements, including a damping means in which the elastomer compound is intimately bonded to the composite flexible strips which surround it;

one of the preceding arrangements, including a damping means in which a compression prestress is imposed on the elastomer compound by the geometrical arrangement resulting from the embedding of the extremities of the composite flexible strips in a fixed spaced apart relationship, and one of the preceding arrangements, into which is inserted a means to modify, over at least a portion of the elastic travel, the flexibility of the device, by the intervention of either a limit stop, a mechanical correction of the flexibility, or of an oblique flexible strip intended to reduce the rigidity of the device.

Each composite flexible strip can preferably be made of a composite material that is formed from a polymer matrix reinforced by long fibers oriented monodirectionally, or from multiple alternating layers of thin sheets (made of metal or a flexible polymer material) and thin layers of elastomer compound to which the thin sheets can be intimately bonded.

Preferably, the selection of the matrix and the long reinforcing fibers makes it possible to realize a composite material having a modulus of elasticity in traction-compression between about 30 GPa and about 150 GPa in a manner which makes possible the realization of the elastic device so that the number of composite flexible strips can be limited to about four or six and therefore consisting of, respectively, about at least two or at least four damping layers of elastomer compound.

One aspect of the invention resides broadly in an internal combustion engine comprising a mechanical power generating device for generating mechanical power, a first wheel device being connected to and receiving mechanical power from the mechanical power generating device, a second wheel device positioned in spaced apart relation to the first wheel device, the second wheel device being connected to and receiving at least a portion of the mechanical power from the first wheel device, a belt having a surface, the belt being connected between the first wheel device and the second wheel device for transferring mechanical power from the first wheel device to the second wheel device by mechanical friction, and a belt tensioning device for being in contact with the surface of the belt for adjusting the tension of the belt means by applying a controlled amount of force to the surface of the belt. The belt tensioning device comprises, a mounting apparatus for being mounted on a first surface, the mounting apparatus for supporting the belt tensioning device, a resilient member connected to the mounting apparatus, a movable member connected to the resilient member, the movable member for being in contact with the belt, the movable member being movable relative to the mounting means to alter the tension of the belt, the movable member comprising apparatus for applying pressure to the belt, the resilient member for receiving a rocking force and applying a rocking counter force between the mounting apparatus and the movable member when the movable member is moved relative to the mounting means. The resilient member comprises at least two flexible arms, the at least two flexible arms being spaced apart from one another.

An additional aspect of the invention resides broadly in a belt tensioning device for tensioning a belt of a power transmission device, the belt tensioning device for being in contact with a surface of a belt for adjusting the tension of the belt by applying a force to a first surface of the belt. The belt tensioning device comprises mounting apparatus for being mounted on a first surface, the mounting apparatus for supporting the belt tensioning device, a resilient member connected to the mounting apparatus, a movable member connected to the resilient member, the movable member for being in contact with the belt, the movable member being movable relative to the mounting apparatus to alter the tension of the belt, the movable member comprising apparatus for applying pressure to the belt, and the resilient member for receiving a rocking force and applying a rocking counter force between the mounting apparatus and the movable member when the movable member is moved relative to the mounting apparatus. The resilient member comprises at least two flexible arms, the at least two flexible arms being spaced apart from one another.

BRIEF DESCRIPTION OF THE DRAWINGS

The invention is explained in greater detail below and with reference to the accompanying drawings, in which:

FIG. 9 shows another variant of the elastic tensioning device in which the stop function is performed by the tensioning of a length of internal cable fixed within the deformable parallelepiped solid;

FIGS. 10a and 10b illustrate an elastic tensioning device having increased flexibility as a result of the insertion of a semi-embedded oblique strip within the deformable parallelepiped solid;

FIG. 12 shows an exploded exterior view of the different components of the variant illustrated in FIG. 11, in an unassembled state;

DESCRIPTION OF THE PREFERRED EMBODIMENTS

Figure 1:
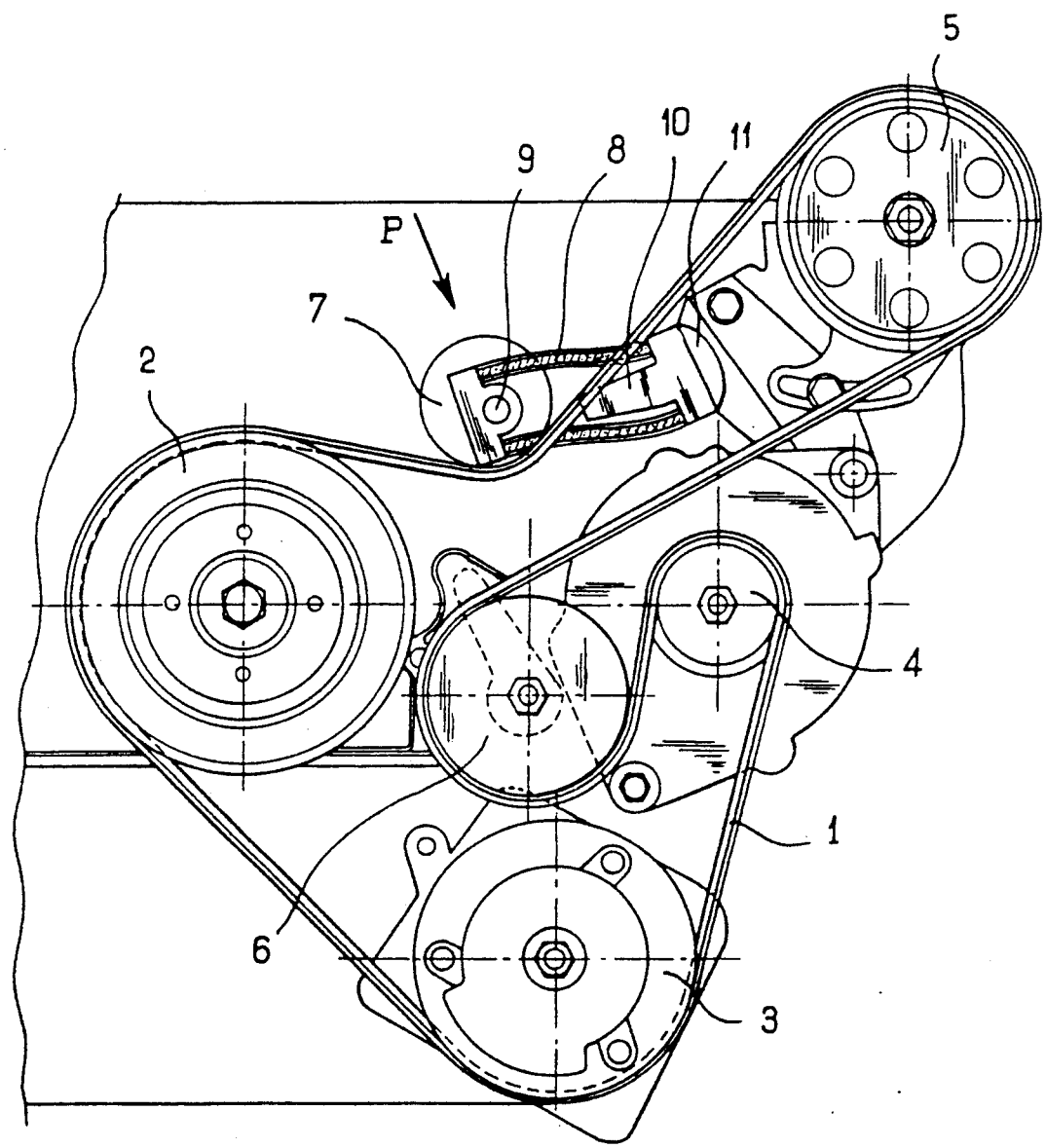
FIG. 1 is a partial view of an automobile engine, showing the arrangement of the pulleys which drive the various accessories, and the elastic tensioning device of the flexible link according to the invention.
Figure 1A:
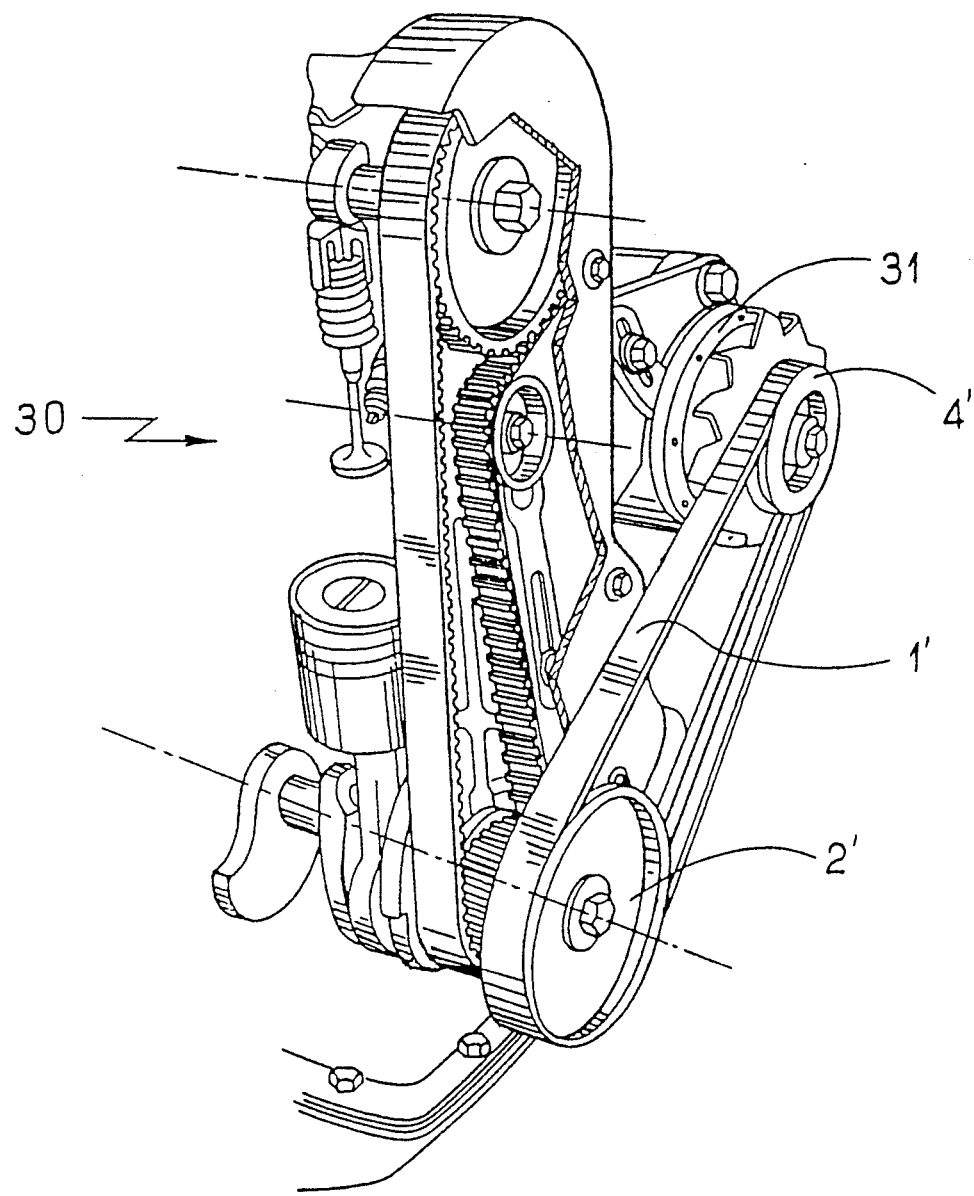
FIG. 1a is a perspective view, partially in section, of a portion of a known internal combustion engine.

FIG. 1a shows a known combustion engine, which can be used, for example, in an automobile. Internal combustion engines 30 are usually designed to operate a plurality of accessories, such as an alternator 31, a water pump (not shown), etc., in addition to typically propelling an automobile or the like or providing power for stationary purposes. Under typical operating conditions, the belt 1' transfers the mechanical power from the engine to the accessories such as the alternator by mechanical adherence of the belt 1' to the pulleys 2' and 4' of the drive and the alternator, respectively. This type of operation can essentially only be possible when the belt 1' is tensioned properly about the pulleys 2' and 4' on the engine and accessories.

FIG. 1 shows a partial view of an automobile engine which has the mechanically drivable accessories. The engine itself can generally be mounted either axially or transversely, and the accessories can be driven by a flexible link 1, e.g. of the multi-ribbed belt type, contained in a plane, in which plane the flexible link 1 can be wound around several pulleys. The pulleys themselves can have different radii, but essentially should have the same groove profile about their perimeter.

A drive pulley 2, generally located on the crankshaft of the engine, can communicate its movement, on one hand to the relatively low speed accessories, such as the air conditioning compressor, by means of a large diameter driven pulley 3, and, on the other hand, to accessories needing to rotate more rapidly than the crankshaft, such as an alternator, by means of a small diameter driven pulley 4. If there are other accessories, such as a vacuum pump or a power steering system, an additional driven pulley 5 can supplement the sinuous path of the flexible belt 1. In such an arrangement, the mechanical adherence requirements, in particular the requirement that the winding angle exceed 180 degrees around the small diameter driven pulley 4, can necessitate a return via a stationary pulley 6. The adjustments during assembly of such an arrangement of pulleys, for example, can preferably be made possible by a slot which allows for the adjustable positioning of the additional driven pulley 5. The stationary pulley 6, which can have any desired diameter, as can the tensioning pulley 7, generally rolls via a cylindrical surface against the back of the flexible link 1, and can drive, if desired, an accessory which has a low mechanical adherence requirement.

Preferably, the permanent thrust of the elastic tensioning device 8 against the tension pulley 7 makes possible the driving of these various accessories by mechanical adherence. The tensioning roller 7 is positioned to be in contact preferably with the part of the flexible link 1 which has the least tension, which part is generally at the output side of the drive pulley 2. The thrust P, which slightly increases the winding angle of the flexible link 1 on the two neighboring pulleys, should be applied along the line bisecting the obtuse angle formed by the corresponding parts of the flexible link 1. The elastic tensioning device 8, which provides this thrust P, preferably supports the bearing 9 of the tensioning pulley 7, and can be fixed, along with a possible stop 10 for mechanically limiting the flexibility, onto the engine crankcase by means of an adjustable fastener 11.

Figure 2:
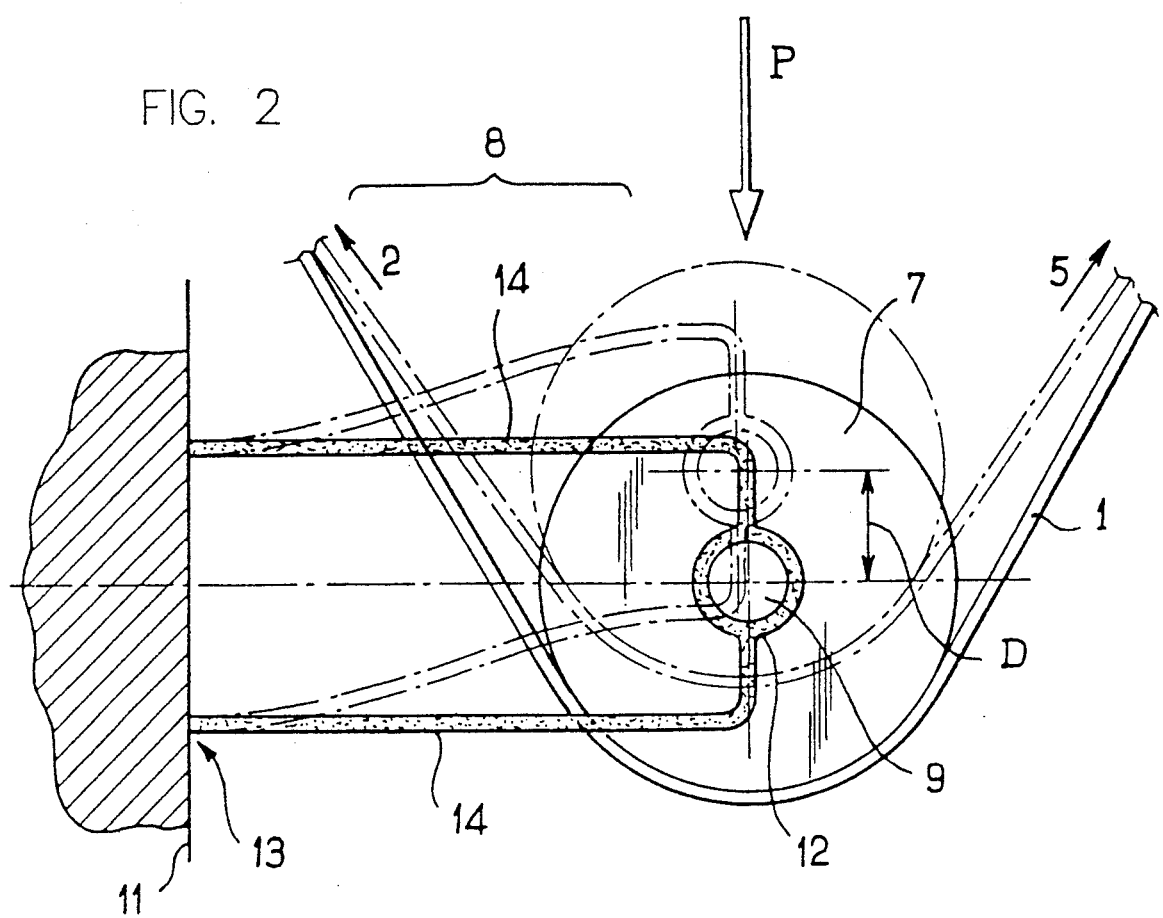
FIG. 2 is a schematic diagram of an elastic tensioning device realized in the form of a deformable parallelepiped solid exerting pressure on a flexible link.

FIG. 2 schematically illustrates the general case of an elastic tensioning device 8, shown by the solid lines, in its idle position in contact with the flexible link 1, and which tensioning device is realized in the form of a preferably deformable parallelepiped solid. The pair of composite flexible strips 14 essentially constitute the two major sides of the deformable parallelepiped solid, and the minor sides are essentially constituted by the embedded portions 13. The parallel-epiped solid supports the bearing 9 of the tension pulley 7 by means of a bearing holder block 12 integrated into the deformable parallelepiped solid on one minor side. The other minor side can preferably be integral, by means the embedded portions 13, with an adjustable fastener, here symbolized by only a rigid wall 11.

To exert the thrust P on the flexible link 1, an elastic deformation D is imposed on the deformable portions of the parallelepiped solid, the extremities of which are embedded in the adjustable fastener 11 and in the bearing holder block 12. The tensioning device 8, in the deformed position (shown in dot-dash lines), is schematically illustrated attached to the adjustable fastener 11. The flexible link 1 can be stretched between the drive pulley 2 and the additional driven pulley 5, e.g. by displacement of the additional driven pulley 5, during assembly, by means of a mounting slot. The pair of composite flexible strips 14, now under tension, will then usually be deformed in different manners, depending on the type of fixing described in the different variants.

Figure 3:
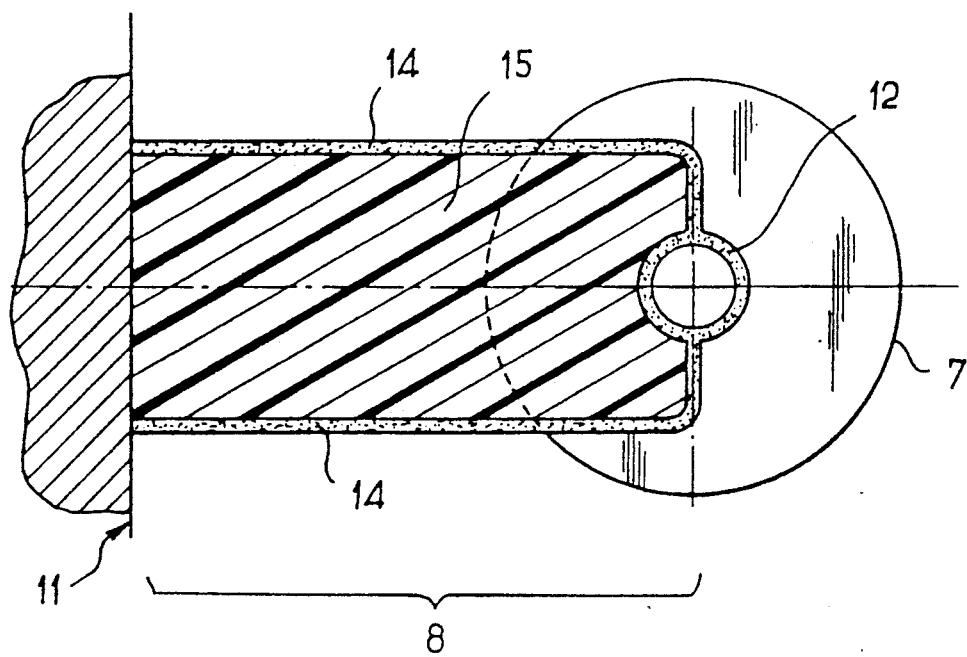
FIG. 3 shows one possible integration of the mechanical damping of the vibrations of the flexible belt by the insertion of an elastomer block into the device, which elastomer block can be either bonded, or not bonded, to the composite flexible strips forming the major sides of the deformable parallelepiped solid.

FIG. 3 shows one possible integration of the mechanical damping of the vibrations of the flexible link. In this configuration, the tensioning device 8 can preferably have an elastomer block 15 inserted between the pair of flexible strips 14 of the deformable parallelepiped solid, shown here in the idle position. The elastomer block 15 can preferably be realized in the same shape as the parallelepiped solid, but does not necessarily have to have the identical shape. When realized in the same shape, the elastomer block 15 can either be intimately bonded by appropriate means, such as adhesives or an in-place adherization, to the composite flexible strips 14 which surround it, or the block 15 can be in simple contact with the deformable parallelepiped solid and therefore retain the capability of executing micro-slips during movement. The elastomer block 15, in the variant of FIG. 3, in which the block 15 essentially has the same shape as parallelepiped solid, preferably occupies the entire rectangular section between the composite flexible strips 14, two of which are present in the illustration.

In a variant not illustrated, the elastomer block 15 can only partly occupy the empty space between the elastic composite strips 14 to which it would then be intimately bonded, over the contact width, to prevent its displacement under the action of stresses.

Figure 4:
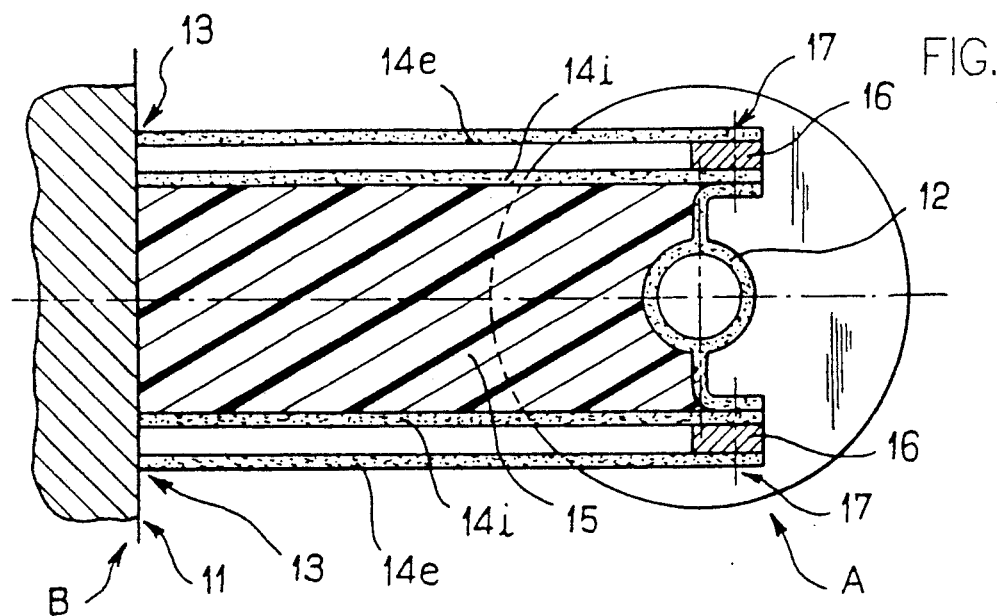
FIG. 4 represents one variant of the elastic tensioning device where the deformable parallelepiped solid is constituted on its major sides by composite flexible strips assembled in pairs, and where the damping of the vibrations of the flexible link is performed by an elastomer block.

FIG. 4 shows, under the same idle conditions, a variant of the deformable parallelepiped solid, composed on its major sides of four composite flexible strips 14$i$ and 14$e$, assembled preferably in pairs, and the damping of which is performed by an elastomer block 15, which can occupy all of (as shown), or part of the empty space between the composite flexible strips 14$i$.

When the elastomer block 15 occupies the entire empty space, it may or may not be intimately bonded to the composite flexible strips 14$i$ which surround it. When the elastomer block 15 occupies only part of the empty space, it should preferably be intimately bonded, over the contact width, to the composite flexible strips 14$i$ which surround it, to prevent displacement of the block 15 under the action of stresses.

The mechanical fastening of the mobile extremity A to the bearing holder block 12 can preferably provide the fixing of the movable ends of one set of the strips 14$i$ and 14$e$ in a spaced apart manner from the movable ends of the other set of strips 14$i$ and 14$e$. In a similar manner, the two exterior composite flexible strips 14$e$ can be attached to the two interior composite flexible strips 14$i$ by means of spacers 16, which provide the fixing of the space between the strips 14$i$ and 14$e$ of each pair.

A set of bolts or rivets, symbolized by the lines 17, can be used to fasten together this embedded portion. Also, the fixed extremity B can be integrally fastened to the adjustable fastener 11 by means of embedded portions 13 (not shown).

Figure 5:
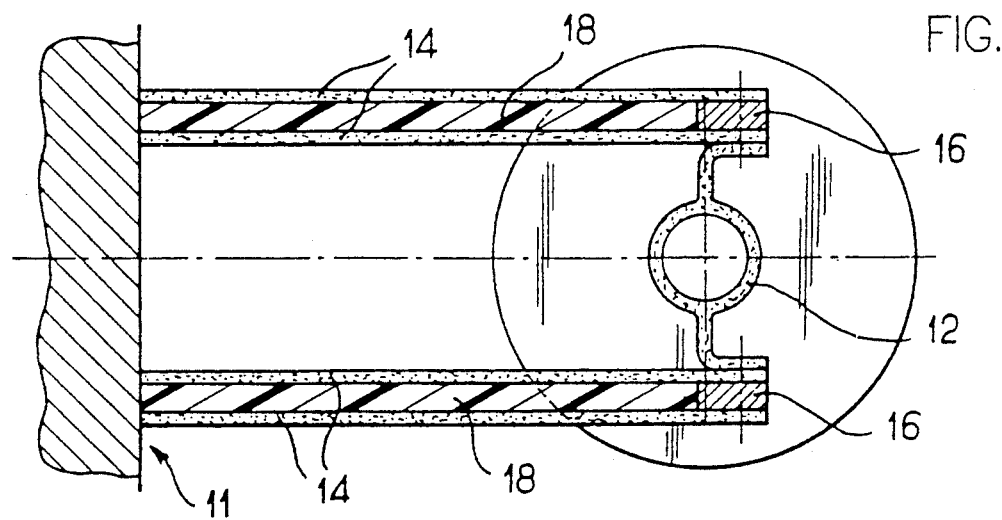
FIG. 5 is a variant of the elastic tensioning device with composite flexible strips assembled in pairs, the device having an integrated damping as a result of the insertion of an elastic layer between the strips in each of the pairs of composite flexible strips.

FIG. 5 shows one variant of the elastic tensioning device, where the deformable parallelepiped solid also has an arrangement in which the composite flexible strips 14 are assembled in pairs. In this variant, the mechanical damping of the vibrations of the flexible link is integrated by insertion of a layer 18, preferably made of elastomer compound, between each of the composite flexible strips 14 of a pair. This layer 18 can also possibly be bonded to the contact surface of the composite flexible strips 14 which surround it. In addition, the mechanical fastening of the strips 14 to the bearing holder block 12 by means of spacers 16 may make it possible, when the spacers 16 have a thickness less than that of the layers 18 between the strips, to exert a compression prestress on the elastomer compound constituting the layers 18.

Such a compression prestress, which prestress could be, for example, about a 10% deformation of the initial thickness of the layers 18 between the strips, because of a supplemental hysteresis effect, at least in the vicinity of the extremity of the composite flexible strips 14, participates in the visco-elastic damping of the vibrations of the flexible link. Such vibrations of the flexible link are essentially reduced by the alternating variations of the shearing within the mass of the elastomer compound, when there is parallel flexing of the pairs of composite flexible strips 14.

In a variant not illustrated, the mechanical damping of the vibrations of the flexible link may also be supplemented by the insertion, over all or part of the rectangular cross section between the internal composite flexible strips 14, of an additional elastomer block 15. Use of this additional block 15 can help to reinforce the damping action of the layers 18 between the strips, if such is required by the particular application.

FIGS. 6a, 6b, 6c, and 6d combine several variants of the elastic tensioning device according to the invention. These variants can include a deformable parallelepiped solid which can have either a pair of single strips, a pair of pairs of strips, or a combination consisting of a single strip and a pair of composite flexible strips.

Figure 6A:
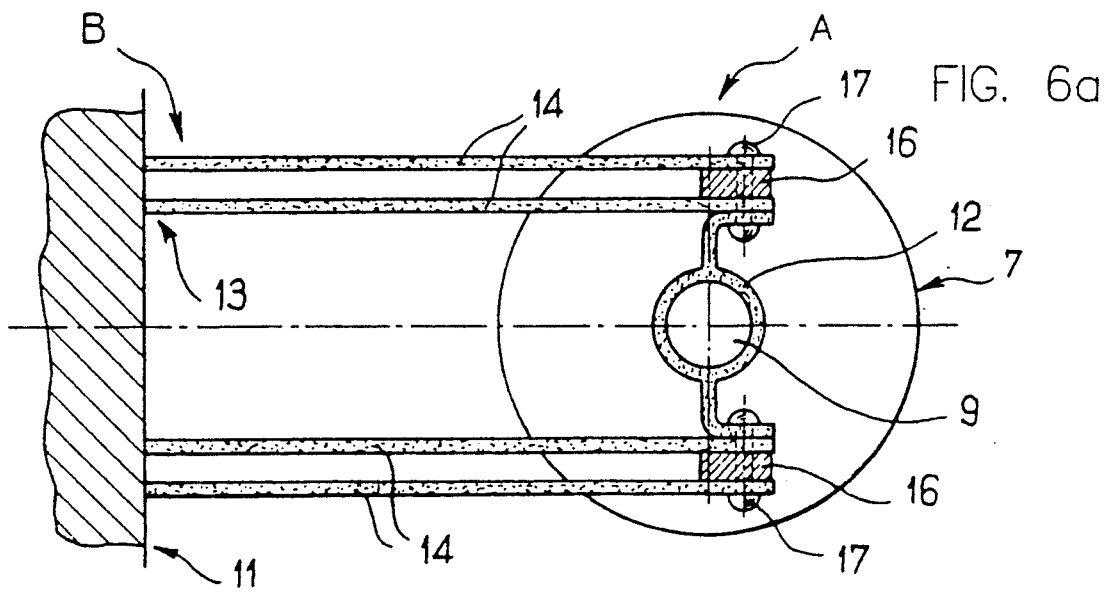
FIGS. 6a, 6b, 6c, and 6d show several variants of the elastic tensioning device, whose deformable parallelepiped solid includes either a pair of single strips, a pair of pairs of strips, or a combination consisting of a single strip and a pair of composite flexible strips.

FIG. 6a illustrates the case in which the deformable parallelepiped solid is constituted, on its major sides, by only two pairs of composite flexible strips 14, without the addition of a visco-elastic damping element for damping the vibrations of the flexible link. The composite flexible strips 14 can preferably be fixed in pairs by mechanical means, represented by the lines 17, to enclose the spacers 16. The ends of the strips 14 can be fastened to the spacers by some common fastening means, which fastening means is represented here by rivets which also simultaneously fasten each pair of elastic flexible strips 14 to the bearing holder block 12. This multiple fastening method is represented at the mobile extremity A. An identical or different fastening device, symbolized by a rigid wall 11, can encompass the fastenable portions 13 at the fixed extremity B.

A guidance over an approximately straight line trajectory can thereby consequently be imposed on the tension pulley 7, which tension pulley 7 can be supported by its bearing 9 in the elastic deformation of the deformable parallelepiped solid.

The high rigidity in the perpendicular directions provided by the width of the composite flexible strips 14 makes it possible to maintain the device so that the axis of the bearing 9 remains completely orthogonal to the plane of the figure during use.

The separation of the pairs of composite flexible strips 14 by the bearing holder block 12 also provides high resistance to kinking, or excessive twisting of the composite flexible strips 14, which kinking is caused by the action of the parasite torsion torque formed, or exerted by the lever arm of the tension pulley 7, because the tension pulley is separated, and cantilevered laterally from the plane of axial symmetry of the composite flexible strips 14.

Figure 6B:
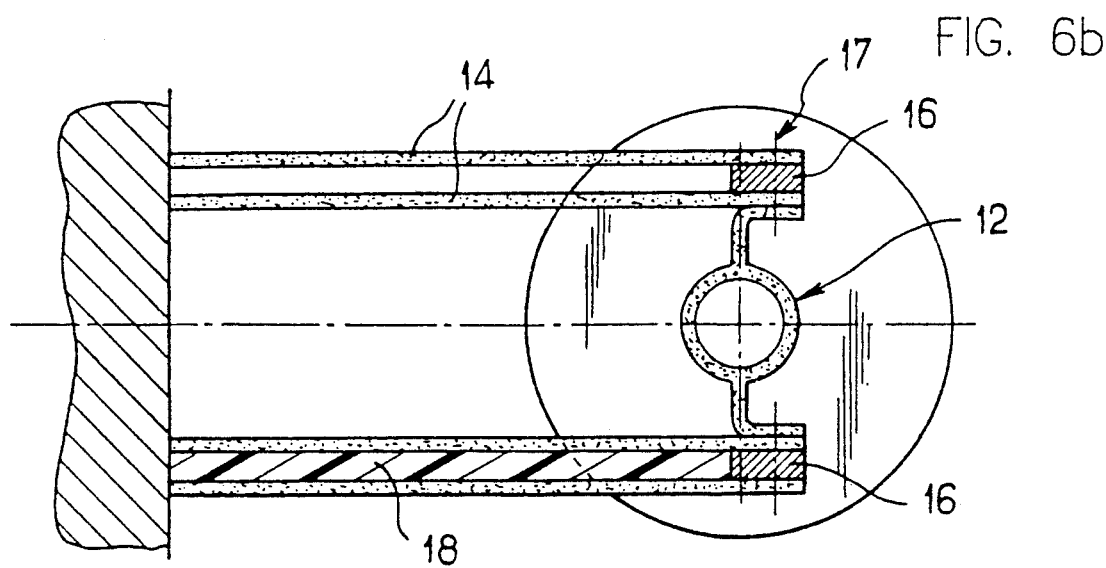

FIG. 6b illustrates the case where the major sides of the deformable parallelepiped solid can be formed by two pairs of composite flexible strips 14, one pair of which can be equipped with a layer 18 between the strips 14 of the pair. The layer 18 can preferably be made of elastomer compound and can preferably be intimately bonded, by adhesive or in-place adherization to each of the composite flexible strips 14 which surround it. In this variant, the other pair of composite flexible strips 14, intimately connected like the first by means of a spacer 16, does not necessarily need to have a layer between the strips 14 to provide additional visco-elastic damping of the vibrations of the flexible link. The bearing holder block 12 is shown rigidly connected by means of a mechanical fastener, symbolized by the lines 17, which fastener makes it possible to apply a compression prestress to the mass of the elastomer compound of the layer 18 between the strips of the pair of composite flexible strips 14 with which it is equipped. This prestress can essentially be possible when the corresponding spacer 16 has a thickness which is less than the thickness of the layer 18 between the strips 14.

Figure 6C:
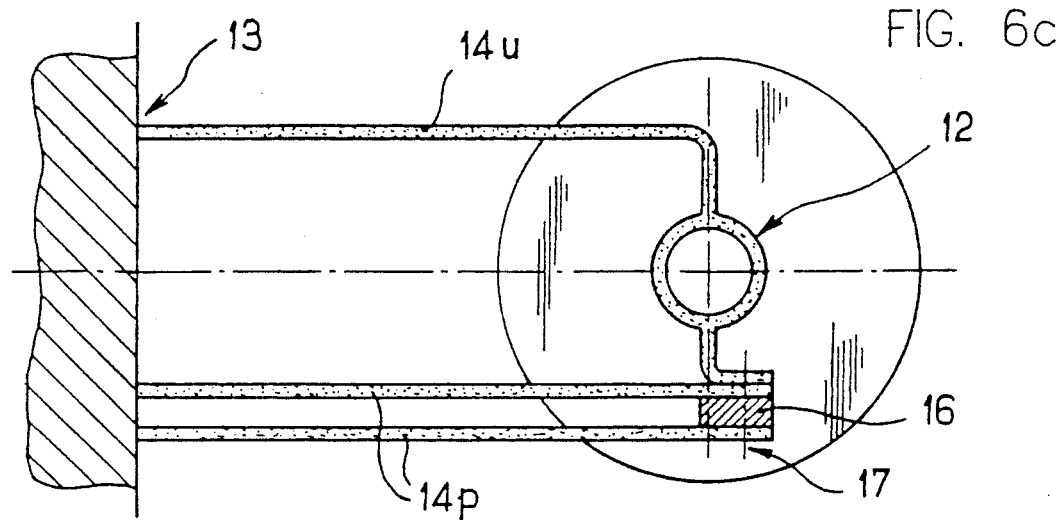

FIG. 6c describes an intermediate case, where the calculation of the rigidity of the elastic tensioning device results in a deformable parallelepiped solid whose major sides can be constituted by three, or a higher odd number, of composite flexible strips 14 of similar design.

FIG. 6c shows an arrangement in which the single composite flexible strip 14u can be integrated into the bearing holder block 12, while, on the other side, the pair of composite flexible strips 14p, which can be connected to one another by means of a mechanical assembly preferably with a spacer 16 and a set of bolts or rivets along the line 17, can be fastened by a mechanical means to the bearing holder block 12.

Depending on the requirements of the particular application, the pair of composite flexible strips 14p can also include a visco-elastic damping element to dampen the vibrations of the flexible link. As stated previously, this damping element can be in the form of a layer of elastomer compound between the strips 14p, or between the strip 14u and the inner strip 14p, and the elastomer can be intimately bonded to the two composite flexible strips which surround it.

Figure 6D:
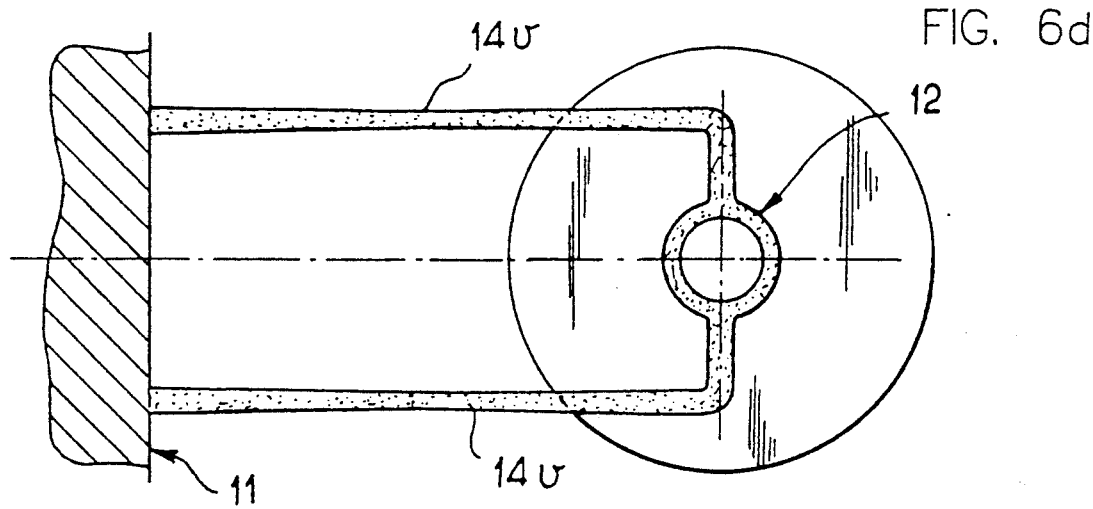

FIG. 6d illustrates a deformable parallelepiped solid in which the major sides can be constituted by a pair of single composite flexible strips 14v having a variable thickness, e.g. thinner in the central region, to uniformly distribute the stresses at all points of each of the composite flexible strips 14v. Such a configuration of the composite flexible strips 14v can be realized by forming the strips under a controlled rolling if the composite flexible strips 14v are made of a composite of alternating metal sheets and thin elastomer compound layers. If the composite flexible strips 14v are made of composite material consisting of a polymer matrix reinforced with long fibers oriented monodirectionally, the variations in thickness of the strips can be realized by molding.

In a preferred realization, the composite flexible strips 14 can be made of a composite material, and they can have a thermoplastic or thermosetting polymer matrix impregnating the long textile or metal fibers.

To meet the requirements for most applications, the modulus of elasticity in traction-compression of the composite material should preferably be in a range of about 30 GPa to about 150 GPa, and preferably between about 35 GPa to about 80 GPa.

In addition, on account of the stresses to which the tensioning device is exposed during operation, the composite material should preferably have a rupture elongation equal to at least about 1% of its initial length. On the other hand, it is generally not necessary for the composite material to have any particular thermal characteristics since it will be used in a thermal environment compatible with the polymer nature of the material of which its matrix is made. However, if it is desirable to use such a tensioning device under extreme temperature conditions, the thermal characteristics of the composite can be adjusted as required to suit those extreme needs.

The mechanical characteristics, in particular the modulus of elasticity of a composite material containing long fibers, are essentially governed by three parameters, namely the mechanical properties of the fibers, their proportion by weight or by volume, and their orientation in the composite material. In addition, the response of the composite material to external stresses is essentially dictated to a great extent by the elastic and plastic behavior of the constituent elements and is generally a consequence of the mechanical reactions of the matrix material and those of the long fibers.

Among the polymer materials which can constitute the matrix, the thermoplastic polymers can include, but are not limited to: polyolefins, polyesters, polyamides and polyimides, and the thermosetting polymers can include, but are not limited to: epoxy resins, phenol resins and formo-phenol resins.

Of the above compounds, polyolefins have the disadvantage that they require special treatments to guarantee their adherence to the long fibers, and since this intimate bonding between the matrix and the fibers is an essential characteristic for the behavior of the composite material, the perfomance level of the polyolefin materials is significantly decreased as soon as the fiber is no longer intimately bonded to the matrix.

The fibers which can be used as reinforcement elements for the matrix should preferably be selected to meet the requirements of the intended utilization. Therefore, the fibers should preferably be selected from among those having at least about a 1% elongation at rupture and a modulus of elasticity between about 30 GPa and about 400 GPa, since it is the modulus of elasticity of the long fibers which, to a great extent, essentially determines the modulus of elasticity of the composite material.

Therefore, as examples, the following types of fibers can preferably be used: polyvinyl alcohol fibers which generally have a modulus of elasticity slightly higher than about 30 GPa; glass fibers whose modulus of elasticity, as a function of the quality, is between about 40 GPa and about 90 GPa; aramid fibers which have a modulus of elasticity from about 70 GPa to about 130 GPa, or certain metal fibers such as aluminum, whose modulus of elasticity is on the order of about 70 GPa to about 80 GPa.

Carbon fibers, used by themselves, have a modulus of elasticity which is rather high. Therefore, if carbon fibers are to be used, they will preferably be used in the form of hybrid carbon/glass fibers, which generally have a very wide range of moduli of elasticity.

Another important factor for the performance of the composite material constituting the composite flexible strips 14 is the proportion of fibers in the material.

For the requirements of the application, and taking into consideration the nature of the polymer material of the matrix and that of the fibers, the volume proportions of the fibers in relation to the overall composite should be between about 40% and about 80%, and preferably between about 60% and about 70%.

The properties of the composite materials are generally also a function of the orientation of the fibers in the matrix. For the requirements of the application, an orientation of the fibers between about $-8$ degrees and about $+8$ degrees in relation to the longitudinal axis of the composite flexible strips 14 is desirable, and an orientation of preferably between about $-5$ degrees and about $+5$ degrees has generally proven satisfactory.

Among the composite materials realized in this manner, the following matrix/fiber combinations which exhibit the best performance levels, can be cited. These examples are to be taken as non-restricting examples only.

For a modulus of elasticity range of from about 30 GPa to about 50 GPa, the composites consisting essentially of:

a polyester matrix and about 60 vol. % aramid fibers, or an epoxy matrix and about 66 vol. % glass fiber S.

For a modulus of elasticity range of from about 50 GPa to about 80 GPa, the composites consisting essentially of:

an epoxy matrix and 73 vol. % glass fiber E, or
a polymide matrix and 64 vol. % aramid fibers.

For a modulus of elasticity range of from about 80 GPa to about 100 GPa, the composites consisting essentially of:

phenol matrix and 40 vol. % aramid fibers, or
epoxy matrix and 58 vol. % hybrid carbon/glass fibers.

The flexibility of the matrix is generally only a secondary characteristic, and it can preferably be adjusted, as necessary, e.g. by a combination of compatible polymers, to form polymer alloys. In the case of epoxy matrices, the flexibility can easily be adjusted by a combination, within appropriate proportions, of rigid and flexible epoxy resins. The modulus of elasticity in traction-compression of the composite material realized in this manner can be used in the subsequent assembly of the components.

Figure 7A:
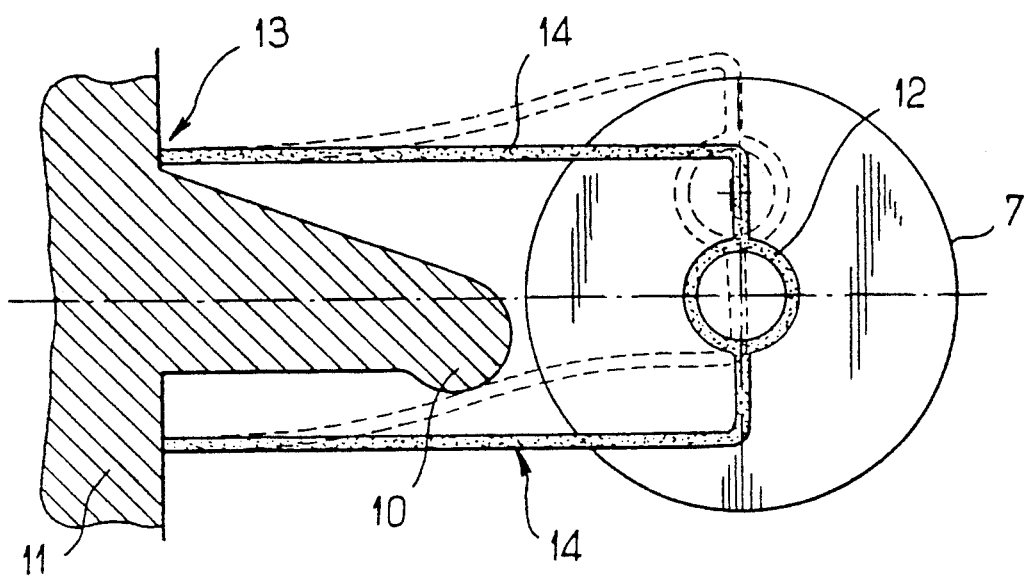
FIGS. 7a and 7b illustrate an elastic tensioning device incorporating a rigid stop for mechanically limiting the flexibility of the device.

FIG. 7a illustrates the arrangement of a stop 10 which can preferably mechanically limit the flexibility if such limitation is desired. The stop 10 can generally act by either sudden or gradual entry into contact with one of the composite flexible strips 14 of the deformable parallelepiped solid or the bearing holder block 12 which is completely integrated into it, forming one piece with the two composite flexible strips 14. The principle of such an entry into contact, beyond a functional zone with a high and essentially constant flexibility, is also applicable to the case where the major sides of the deformable parallelepiped solid include one or two pairs of the composite flexible strips 14.

After the mechanical contact between the mechanical flexibility limitation stop and a composite flexible strip 14, which is contiguous to it, the elastic deformation of the deformable parallelepiped solid remains possible, although it exhibits a significantly higher rigidity. This phenomenon then modifies the resonance frequency which can be produced under certain load and speed conditions of the motor, which conditions are generally rather close to the slow speed running conditions.

Upon contact with the stop, an elastic recall rigidity in the elastic tension device, which can generally be two to three times higher than at the beginning of the travel, intervenes appropriately to change the mass-spring system, which mass-spring system consists of the flexible link, from one characteristic frequency to another. Depending on the requirements for the application, the operating position of the tensioning device, with or without integrated visco-elastic damping in the form of a layer of an elastomer compound between the strips, for example, is preferably advantageously located in the immediate vicinity of the entry into contact of a composite strip 14 and the mechanical flexibility limitation stop 10.

Figure 7B:
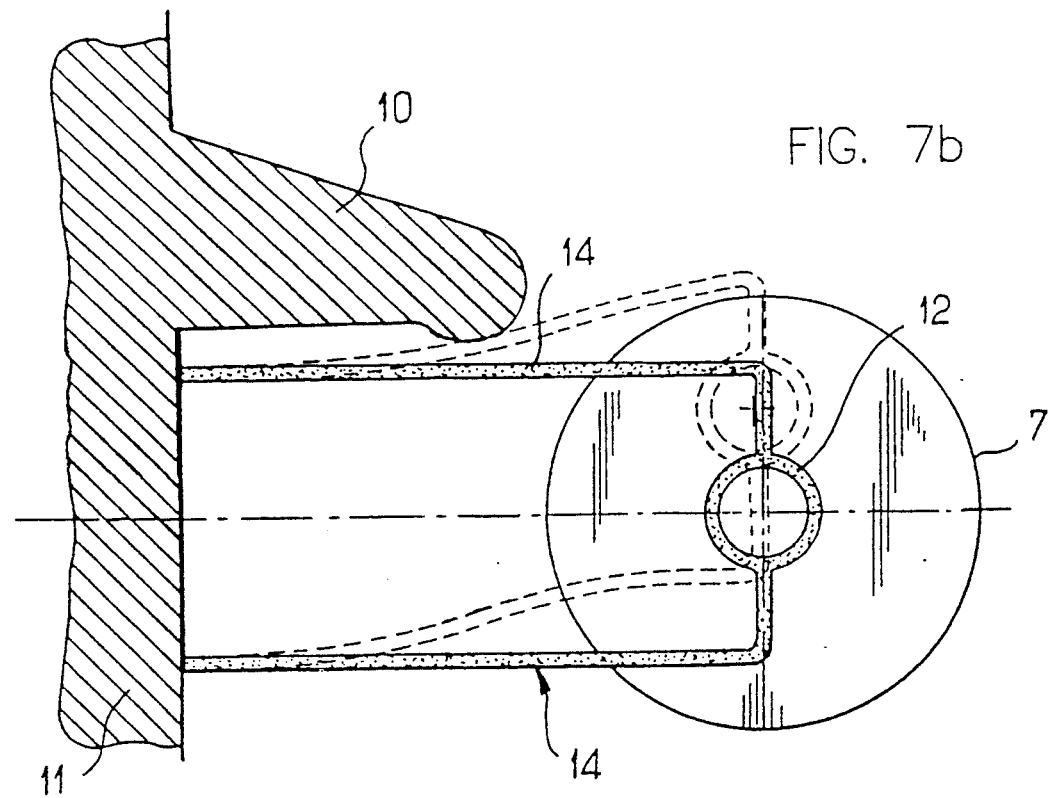

In a variant illustrated in FIG. 7b, where the damping of the vibrations of the flexible link is performed by the elastomer block 15 occupying all or part of the empty space between the composite flexible strips 14, it is necessary to have the mechanical flexibility limitation stop 10 positioned exterior to the deformable parallelepiped solid. The stop 10 will then enter into contact with the exterior of an elastic composite strip 14.

In either case, the mechanical flexibility limitation stop 10, located on either the inside or the outside of the deformable parallelepiped solid, does not act as a travel limiter, but as an element which modulates the characteristic frequency of the tensioning of the device.

Figure 8:
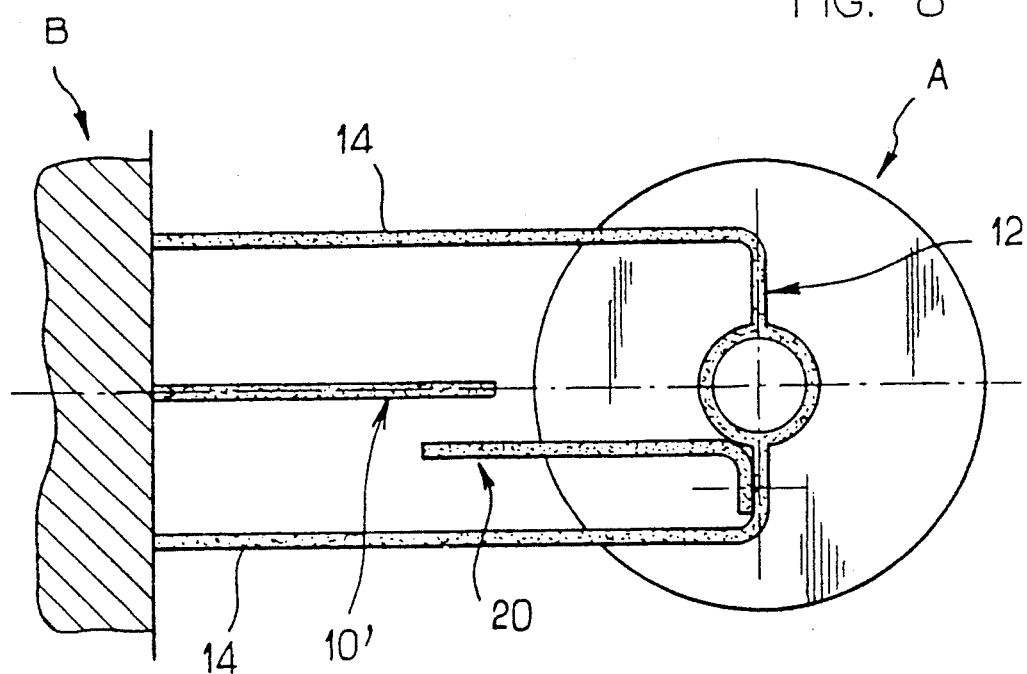
FIG. 8 is a variant of the elastic tensioning device incorporating a flexible stop in combination with an opposing element to mechanically limit the flexibility of the device.

FIG. 8 is a variant of the elastic tension device in which a mechanical flexibility correction stop 10' itself can have a flexing capability. In such a case, the stop 10' can have flexibility characteristics similar to those of the composite flexible strips 14. The stop 10' can advantageously be realized from the same composite material as the opposite element 20 against which the mechanical flexibility correction stop 10' is in contact during operation. After the entry into contact of the mechanical flexibility correction stop 10' against its opposite element 20, an entry into contact which takes place in zones not subject to flexing and which are therefore not very brittle, the rigidity of the deformable parallelepiped solid becomes two to three times higher than the rigidity at the beginning of travel. This rigidity increase is essentially a function of the geometric characteristics of the composite flexible strips 14, the mechanical flexibility correction stop 10', and the opposing element 20.

As in the variants illustrated in FIGS. 7a and 7b, the mechanical flexibility correction stop 10' and its opposite element 20 do not act as travel limiters, but as elements which modulate the characteristic damping frequency of the tensioning device.

FIG. 9 illustrates an additional possible realization for increasing the rigidity of the deformable parallelepiped solid beyond the normal operating position of the elastic tension device 8. This increase of rigidity can be obtained by applying tension to a length of high-strength textile or metal cable 21 which textile or metal cable 21 is not under tension in the deformable parallelepiped solid at the beginning of the deformation travel, or while the tensioning device is in the rest position. The two extremities of the length of cable 21 are schematically shown connected on one hand to the bearing holder block 12, for the movable extremity A, and on the other hand to the adjustable fastener 11 for the fixed extremity B, here symbolized by a rigid wall incorporating the embedded portions 13.

The connection of the extremities of the length of cable 21 to these two anchoring points can preferably be realized either by clamping, in a mechanical assembly, or by integral bonding, in which case the anchoring is achieved by embedding the extremities of cable 21 into the fastener 11 during the molding of the components.

The characteristic modulus of elasticity of the cable 21 should preferably be selected so that when tension is applied on the tensioning device beyond the normal operating position, the rigidity of the device can be doubled or even tripled over the rigidity at the beginning of travel. This effect can significantly modify the resonance frequency of the mass-spring system constituted by the flexible link, under certain characteristic engine operating conditions. Such a modification functions without any rigid stops exerting sudden stresses on the flexible link.

FIGS. 10a and 10b relate to an additional configuration of an elastic tension device 8', which device 8' is given a high degree of flexibility by the insertion of a preferably oblique flexible strip 23 in the deformable parallelepiped solid. This arrangement can be particularly beneficial when it is desirable for force to be exerted on the flexible link by the thrust P of the deformable parallelepiped solid having a high flexibility, consequently making possible a resonance of the mass-spring system constituted by the flexible link, for example at low speeds very much below the speed of the throttled engine. The vibrations can therefore be filtered under all useful engine operating conditions, without the need for additional visco-elastic damping.

An elastic tension device 8', having an approximately constant force, can so be realized with reduced rigidity of the embedded portions. In the variant illustrated in FIG. 10a, the four sides of the deformable parallelepiped solid are preferably connected by four semi-fixed articulations.

As a function of the requirements of the particular application, any number of the semi-fixed articulations can act as relatively flexible hinges. It is generally preferred that the hinges be paired however, and therefore, if only two of the articulations act as hinges, the other two will still constitute rigid embedded portions.

One means of realizing such a relatively flexible hinge is illustrated in detail in FIG. 10b. It consists of, in the hinge region, a local reduction of the thickness 22 of flexible strips 14 in relation to the overall thickness of the composite flexible strips 14 over their entire width.

An oblique flexible strip 23, preferably made of the same composite material as the articulated composite flexible strips 14, can preferably be inserted in the deformable parallelepiped solid, with the extremities of the oblique flexible strip 23 being articulated by analogous means.

The deformability of the elastic flexible strip 23, by a reduction of the center-to-center distance between its two extremities, can advantageously be used to correct the linear elasticity of the deformations of the deformable parallelepiped solid and to make the rigidity of the assembly very low, or even zero, (a negative value is even possible over a limited travel) whereby the elastic tension device 8' is then at an essentially constant force over its entire useful travel. The rotational flexibility of the semi-embedded articulations, obtained for example by reductions in thickness 22, essentially does not adversely affect the rigidity of the overall device in the direction orthogonal to the figure, a rigidity which provides guidance for the idler pulley 7 in directions different from that travelled by its elastic trajectory.

Figure 11A:
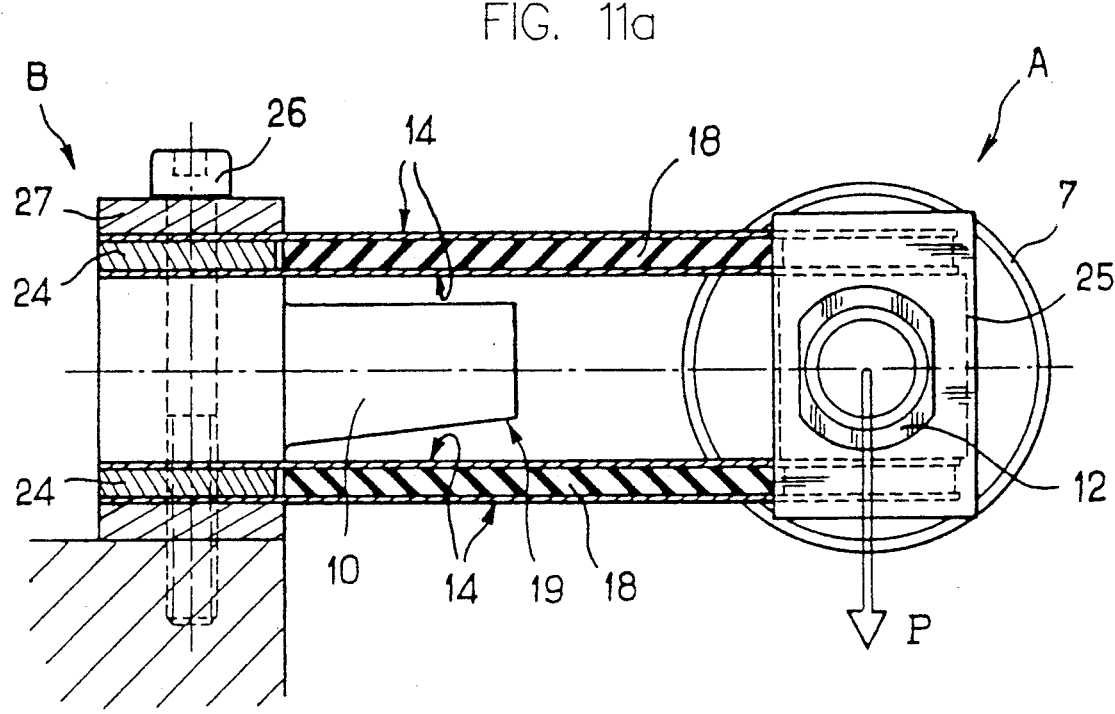
FIGS. 11a and 11b show, in a partial axial section, and in an overhead view, an elastic tensioning device realized by mechanical assemblies.

FIG. 11a shows a partial axial section of an elastic tensioning device 8, shown assembled and installed, but in the absence of the deflection caused by the elastic pressure on the back of the flexible link, whose deformable parallelepiped solid is formed on its two sides by a pair of two pairs of composite flexible strips 14. Each pair of strips 14 includes an element for the visco-elastic damping of the vibrations of the flexible link, in the form of an elastomer compound layer 18 between the strips.

Figure 11B:
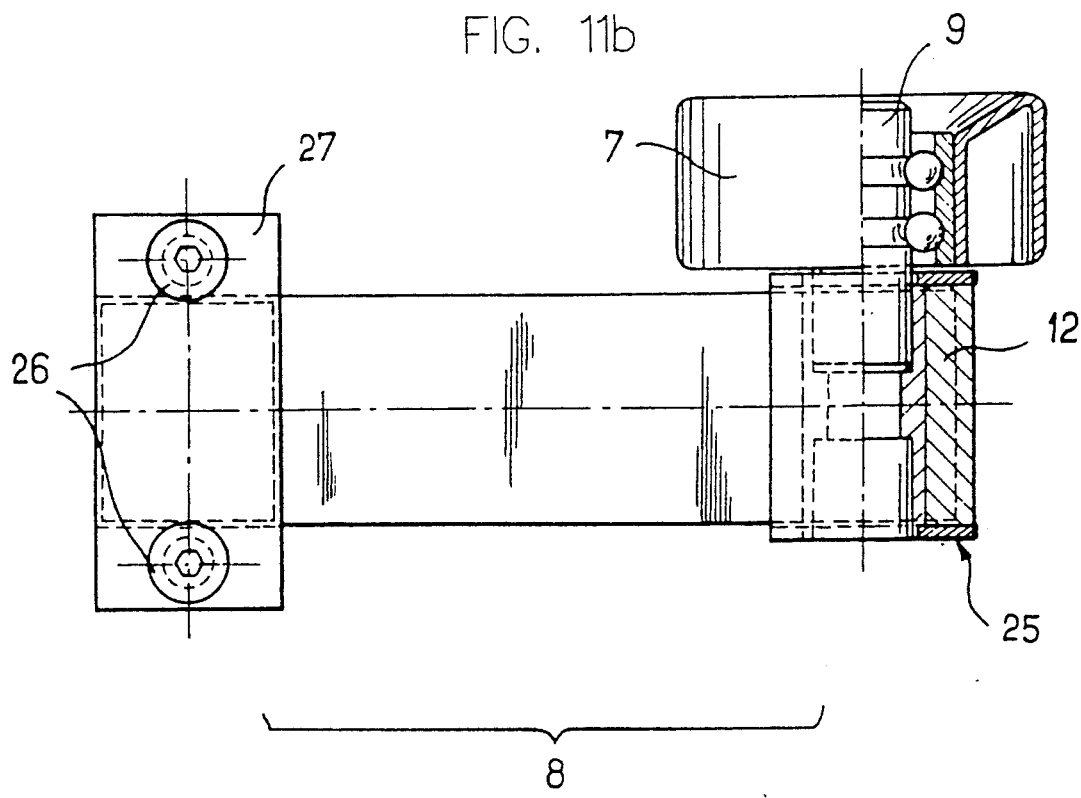

FIG. 11a is a section through the plane of symmetry of the composite flexible strips 14, while FIG. 11b is an overhead view with a partial cross section of the bearing 9 of the tension pulley, and of the tension pulley 7, showing the principle of the assembly of the various parts of the tensioning device.

The tension pulley 7 can be a smooth pulley, essentially consisting of standard, commercially-available sizes. The pulley 7 can preferably be mounted by means of two ball bearings or needle bearings on the bearing 9, which bearing 9 can preferably be force-fit into a cylindrical hole of the bearing holder block 12.

The bearing holder block 12 can preferably be enclosed during assembly in a stack consisting of four composite flexible strips 14 and two spacer shims 24. On the movable extremity A, the stack is secured by tightening a rectangular collar 25, which collar 25 surrounds the entire movable end of the stack and provides the prestress necessary for assembly. The same function could be performed by a structural fastening of the assembly by adhesive. The construction of the bearing holder block 12 and of the mechanical flexibility limitation stop 10 can be carried out using a light alloy, preferably with mechanical fasteners, or a block of thermoplastic or thermosetting polymers, the adhesive fastening of which includes the spacer shims 24, and which then constitutes a more homogenous solution.

At the fixed extremity B, the figure shows a removable assembly, attached by two exterior bolts 26. There is also a clamping plate 27 which ensures the clamping of the mechanical flexibility limitation stop 10. The device can preferably be mounted on the engine crankcase by means of an adjustable fastener 11 by any appropriate means, not shown.

It is evident to a specialist skilled in the art that each type of clamping, whether or not removable, can essentially be applicable to the fixed extremity B as well as to the movable extremity A of the composite flexible strips 14. In both cases, the spacer shims 24, since their thickness is less than that of the elastomer compound layer 18 between the strips and adherized to the two composite flexible strips 14 surrounding it, can be mounted with some play, or clearance in the free state before the plates are pulled together to compress the elastomer layer 18.

The number of composite flexible strips required, in a stack with parallel sides, is determined by the mechanical data of the application. In one embodiment, a deflection on the order of about 20 millimeters and exerting a thrust of about 45 daN constitutes the objective. If spring steel sheets are employed for the tensioning device, the tensioning device would require a considerable number of very thin strips, e.g. approximately one hundred strips 0.25 mm thick, separated by thin layers of elastomer compound.

Even so, the result is a torsional rigidity which is too low, under the action of the parasite eccentricity due to the installation of the tension pulley laterally to the stack of steel strips. The angle elastically assumed by the bearing of the tension pulley, which may possibly be compensated for by the installation or by the shape of the steel strips, nevertheless remains proportional to the elastic flexing. When the latter varies, the variations of the angle are prohibitive for a proper centering of the flexible link 1.

The embedded portion of a pair of two sets of approximately fifty steel strips each surrounding the bearing holder block 12 and the mechanical flexibility limitation stop 10 would constitute the means of bringing the torsional rigidity to the necessary value, but the device thus constituted would be heavy, bulky and expensive to fabricate.

On the other hand, the sizing of an embodiment using composite flexible strips, e.g. a polymer matrix reinforced with long fibers, makes it possible to select a number of strips equal to only four, and a rocking rigidity altogether acceptable for a modulus of elasticity in traction-compression of the composite material at least equal to about 30 GPa.

In addition, the arrangement by pairs, on either side of the bearing holder block 12, and of the mechanical flexibility limitation stop 10, of pairs of composite flexible strips 14, makes possible an easy damping by shearing of a layer 18 between strips. The layers 18 are preferably made of an elastomer compound and located between and intimately bonded by a physicochemical method to the composite flexible strips 14. With such a configuration, specific advantages result, including weight reduction, ease of manufacture and ease of damping.

In a variant not illustrated, the sandwich consisting of composite flexible strips 14 and of the layer 18 between the strips, can be constituted by three composite flexible strips 14 and two layers 18 between the strips. This type of arrangement may be necessary in applications where the thrust P must be greater.

The adaptation by adjustment of the height of the spacer shims 24 makes possible the adjustment of the compression prestress of the elastomer compound of the layer 18 between strips, at least near the embedded portion, because the shape and therefore the parallelism of the composite flexible strips 14 is modified by the flexing.

On the occasion of the parallel flexing of the composite flexible strips 14 with embedded edges, a shearing of the elastomer material of the layer 18 between strips participates in the deformation, giving the strips 14 an additional rigidity which nevertheless remains very moderate. On the other hand, the necessarily cyclical variations of these deformations take full advantage of the visco-elasticity of the elastomer compound of which they are made. The compression prestress also provides a hysteresis effect which turns out to be significant, above all since the elastomer compound withstands a very moderate shearing stress in relation to its potential.

On account of the nature of the composite flexible strips 14, and the low stresses, which are favorable to the choice of a damping elastomer compound, the very simple arrangement of such a sandwich can essentially give the elastic tensioning device 8 a satisfactory viscoelastic damping to counteract the cyclical variations of the elastic tension of the flexible link.

In particular, a rate of visco-elastic damping between about 7% and about 16% of the critical damping turns out to be sufficient to prevent the parts of the flexible link surrounding the tension roller 7 from entering resonance, which parts are quite short in this application. A damping within this type of range thereby limits the risk of vibrations between the different pulleys provoked by the cyclical variation of the power transmitted to the accessories.

FIG. 12 shows an overhead view, in an unassembled state, of the components of the assembly of the elastic tensioning device 8, which parts were previously illustrated in an assembled state in FIGS. 11a and 11b.

The elastic tensioning device 8 can consist essentially of two identical assemblies, each formed by a pair of composite flexible strips 14 associated by intimate physico-chemical bonding to an elastomeric compound layer 18 between the strips.

FIG. 12 shows, in exploded form, spacer shims 24 which can be identical for both the movable extremity A and for the fixed extremity B. At each of these extremities, the shims 24 make possible the fastening of the composite flexible strips 14 by simple clamping, at A, of the bearing holder block 12, and at B, of the mechanical flexiblity limitation stop 10.

The external shape of the mechanical flexibility limitation stop 10 is designed so that it can preferably enter into contact with the closest composite flexible strip 14 at the oblique surface 19 of the stop 10 when the elastic travel exceeds a usual value. This contact effects an increase in the rigidity, due to the deformation of the half of the elastic tension device 8 located at the movable extremity A. The deformation of the half of the composite flexible strips 14, on the side of the fixed extremity B then reaches a ceiling value after the entry into contact with the mechanical flexibility limitation stop 10.

In other words, after contact with the stop 10, the flexible strips, at the extremity B reach a maximum deformation, leaving only the portion of the strips at the extremity A capable of additional deformation, thus, essentially increasing the rigidity of the strip.

Thus, in the dynamic deflections corresponding to an entry into vibrational resonance of the flexible link 1, a gradual rigidification brings about a new characteristic frequency, promoting the extinction by visco-elastic damping of the resonant system, between two geometric limits framing the entry into contact of a composite flexible strip 14 with the mechanical flexibility limitation stop 10. More rounded shapes generally make possible a more gradual variation of the rigidity, if such is desired. The risks of elastic torsion around the longitudinal axis of the elastic tension device 8 are also limited by this contact, which, in the case of variable torsion, would begin from the edge of the composite flexible strip 14 in question.

In one embodiment, represented by FIG. 12, the four composite flexible strips 14 can have a modulus of elasticity in traction-compression at least equal to about 30 GPa, and preferably on the order of about 45 GPa, an effective length of about 80 millimeters, a width of about 38 millimeters and a thickness of about 1.2 millimeters each. The thickness of the layer of elastomer compound 18 between the strips can be about 4.6 millimeters in service under pressure, and about 5 millimeters in the free state, i.e. the strips are prestressed by about 8%. The distance between the two pairs of composite flexible strips 14 can be 30 millimeters, i.e., 37 millimeters between their torsional centers. This distance is used for the calculation of the inertia which counteracts kinking and excessive twisting. Each composite flexible strip 14 acts edgewise by means of its transverse rigidity, which is necessarily high.

Figure 13:
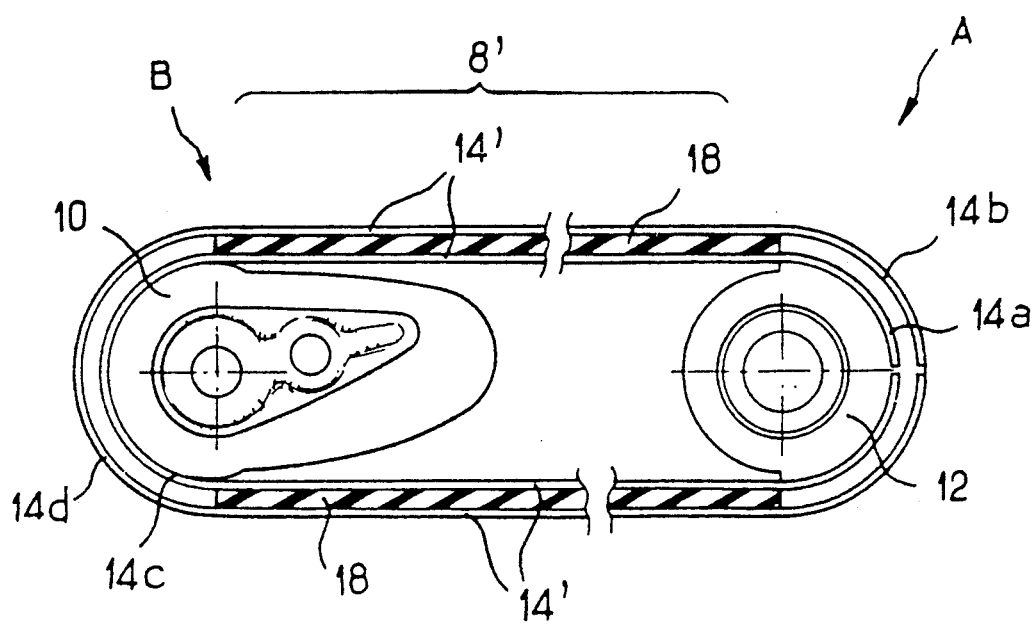
FIG. 13 shows a variant of the elastic tensioning device in which the composite flexible strips are embedded in their supports.

FIG. 13 shows, in an overhead view, a variant of an elastic tension device 8' which performs the same function. The composite flexible strips 14' have their straight portion in the idle state, and the strips 14' can be intimately bonded to the elastomer compound layer 18 between the strips. The right-hand portion of the figure shows, on the side of the movable extremity A of the composite flexible strips 14', the fixing of the unjoined half-rings 14a and 14b in the bearing holder block 12, itself consisting of a polymer material, preferably thermoplastic, which the unjoined half-rings 14a and 14b at least partly surround.

The elastomer compound layer 18 disposed between the strips and preferably intimately bonded to the composite flexible strips 14' in their straight portion, is replaced, in the curved portions, i.e., around the blocks 10 and 12, by the same material constituting the bearing holder block 12, which block 12, essentially surrounded by the curved portions, keeps constant the distance between the composite flexible strips 14' and, with or without prestress, provides confinement for the layer between strips 18.

The left-hand portion of FIG. 13 shows, at the fixed extremity B of the composite flexible strips 14', the embedded portion of one of the sides of closed rings 14c and 14d, which can be one-piece rings. These portions are preferably embedded in the mechanical flexibility limitation stop 10, itself consisting of a polymer material, preferably thermosplastic, which the sides of the closed rings 14c and 14d at least partly surround.

The layer 18 between strips can be replaced, in these curved zones, by the constituent material of the mechanical flexibility limitation stop 10, which material can be identical to or different from the constituent material of the bearing holder block 12. The mechanical flexibility limitation stop 10, surrounded by the curved zones, also keeps the distance between the composite flexible strips 14' constant and ensures, with or without prestress, the confinement of the elastomer compound layer 18 in the deformable portion.

It is obvious, for a specialist skilled in the art, that the unjoined half-rings 14a and 14b can be arranged in the embedded portion of the fixed extremity B in the mechanical flexibility limitation stop 10, just as the arrangement of closed rings 14c and 14d can be fastened into the end portion of the movable extremity A in the bearing holder block 12.

Figure 14:
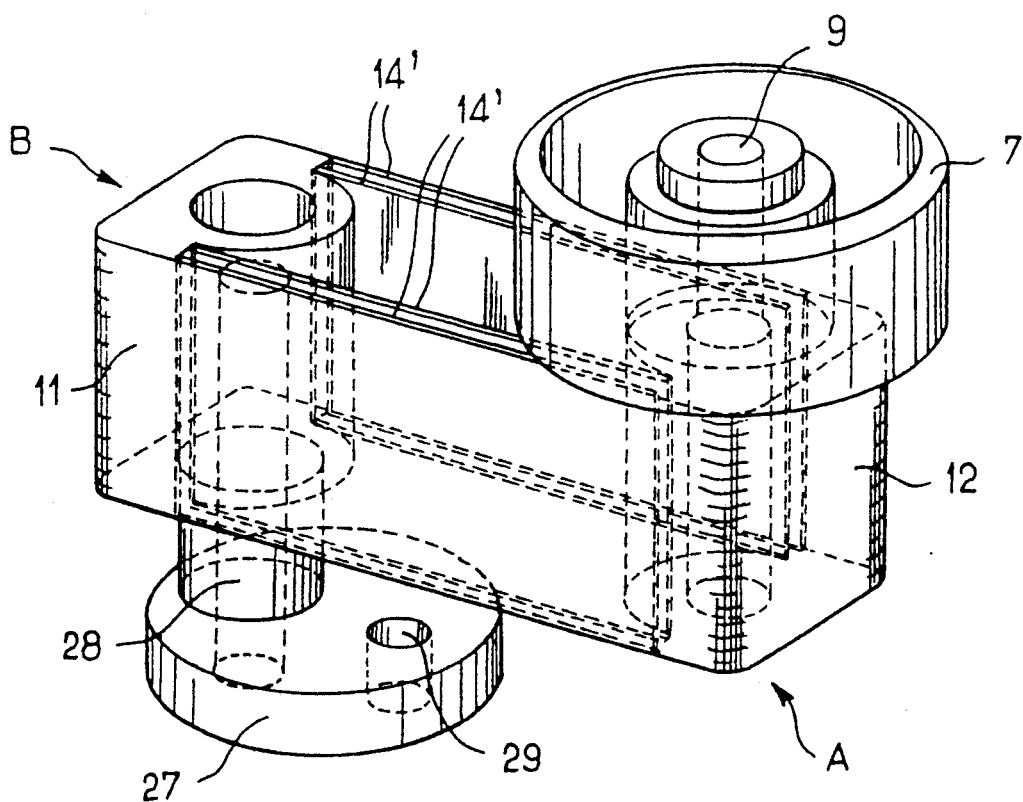
FIG. 14 is a perspective view illustrating the assembly of the elastic tensioning device.

FIG. 14 is a perspective view of one embodiment of the invention in accordance with the description of the preceding figure.

On the mobile extremity A, the bearing holder block 12 is constituted by a molded polymer material which totally integrates the extremities of the four composite flexible strips 14'.

The bearing 9 which supports the tension pulley 7 via the appropriate roller bearings is made integral with the bearing holder block 12, e.g. by force fitting of a shaft into a hole in the holder block 12.

On the fixed extremity B, the extremities of the four flexible strips 14' are also intimately integrated by molding the extremities into a polymer block forming an adjustable fastener 11. The principle of the adjustment is indicated by the existence of a clamping plate 27 which rotates on a shaft 28 fastening it to the crankcase. The adjustment in the slot is preferably provided by bolting through the hole 29. In other words, the clamping plate 27 can be bolted via hole 29 to a mounting surface, such as the engine crankcase. If the crankcase mount is provided with a slot, the bolt through hole 29 can be slid along the slot to provide an adjustable mounting.

The hole 29 can, of course, also be used to support a mechanical flexibility or correction limitation stop (not shown), which can act suddenly or progressively as discussed previously.

A fabrication process for the elastic tensioning device according to the invention includes, after the formation of the composite material constituting the composite flexible strips, a step for the formation of the sandwich of composite flexible strips and the elastomer compound layer placed between the strips, and an assembly step.

The formation of the composite material in the preferred variant consists of an impregnation of the long fibers aligned and arranged according to the selected angle with a polymer matrix in the fluid or paste state, possibly in multiple layers.

The polymer matrix can then be cross-linked, by a thermal treatment under a moderate pressure intended to compact the constituents, in which stage, the cross-linking of the matrix can be either partial or total. The composite flexible strips are then cut, from the plates of the composite material formed in this manner, into the desired dimensions for the application.

In a subsequent operation, intended to make the sandwiches, the elastomer compound layer can then be adherized to the composite flexible strips in a closed mold under pressure and with the addition of heat. This would provide their intimate bonding, by a physico-chemical reaction. This physico-chemical reaction can be conducted simultaneously with the vulcanization of the elastomer compound. In a variant formation of the sandwiches, the partly cross-linked composite flexible strips are introduced, with or without adherization, as a function of the nature of the matrix, into the mold where a co-cross-linking of the matrix and of the elastomer compound of the layer between sheets then takes place, also resulting in the intimate bonding of the components.

The following step is the assembly step, which step differs as a function of the variant of the elastic tensioning device.

In the case of a mechanical assembly, the bearing holder block and the mechanical flexibility limitation stop can be realized in advance, by molding or machining the block or stop out of appropriate materials.

Independently, the spacer shims can be positioned between the composite flexible strips, in the part where there is no elastomer compound layer between the strips. The fixing of these spacer shims can also fix the composite flexible strips, the mechanical flexibility correction stop, if any, and its opposite element, and can provide the prestress of the elastomer layer between the strips. The clamping of a rectangular metal collar then tightens the sandwich/spacer shim assembly, on either side of the bearing holder block and the mechanical flexibility limitation stop.

A mechanical mounting by exterior bolts on a clamping plate can take the place of the clamping using a rectangular metal collar, when positioning slots are necessary for the application.

In variants using a bearing holder block and/or a mechanical flexibility limitation stop made of polymer material, an economical process makes possible the realization of each of these parts, simultaneously with their assembly with the sandwiches of composite flexible strips and the elastomer compound layer between the strips. To do this, the extremities of the unjoined half-rings, or one side of the closed rings, are positioned in the mold bearing the imprint of the bearing holder block or of the mechanical flexibility limitation stop. The constituent polymer material is injected in the fluid or paste state, and solidifies on contact with the walls of the mold, assuming the shape of the imprint, and flooding, in its mass, the extremities of the unjoined half-rings, or the side of the closed rings. The mold can essentially be designed so that the pressure used in the injection molding is distributed to ensure, by confinement, the prestressing of the elastomer compound in the layer between the strips.

Whatever the mode of fabrication, the elastic tensioning device which is the object of the invention, has the following advantages in relation to the known devices of the prior art:

it takes up less space, thanks to a compact realization;

the entire device is lightweight due to the use of low density material in relation to the material used in the conventional components, and also due to the light weight of the dynamically movable masses, thereby reducing the accelerations transmitted by the flexible link; and the device provides an advantageous combination of characteristics;

a simple structure which performs, without any rotating parts, all the guidance functions of the tension pulley, by the deformable parallelepiped solid, an arrangement which makes possible the integration of a damping without friction, having a guaranteed value for the entire life of the vehicle, and can also be regulated independently of the regulation of the tension on the flexible link, and an elastic recall of the thrust on the flexible link, performed by the deformation of composite flexible strips and controlled, beyond the usual zone of operation, by the intervention, gradually if necessary, of the mechanical flexibility limitation or correction stop.

Without going beyond the scope of the invention, a technician skilled in the art can combine among one another the different variants described above as non-restricting examples, or use composites made with new materials, if they meet the requirements of the modulus of elasticity limits.

In summary, one feature of the invention resides broadly in a tensioning device elastically pressing a tension pulley 7 against a flexible transmission link 1 operating by mechanical adherence, constituted by a spring, possibly integrating a damping means, characterized by the fact that the thrust P on the flexible link 1 is exerted by the elastic deformability of a deformable parallelepiped solid constituting the spring, and the major sides of which are formed by a pair of composite flexible strips 14, 14', held parallel and separate by embedding their extremities in a fastener surrounding a bearing holder block 12, on the movable extremity A, supporting a tension pulley 7, the embedded portion of the fixed extremity B on the adjustable fastener 11 on the crankcase of the engine, possibly supporting a means to modify, over a portion of the elastic travel, the flexibility of the elastic tension device 8, 8'.

Another feature of the invention resides broadly in a tensioning device characterized by the fact that the major sides of the deformable parallelepiped solid are constituted by a pair of single, composite flexible strips 14.

Yet another feature of the invention resides broadly in a tensioning device characterized by the fact that at least one of the major sides of the deformable parallelepiped solid is constituted by at least two composite flexible strips 14 held parallel by the interposition of spacer shims 24.

A further feature of the invention resides broadly in a tensioning device characterized by the fact that one of the major sides of the deformable parallelepiped solid is constituted by a single composite flexible strip 14, the other major side being constituted by a pair of composite flexible strips 14 held parallel by the interposition of spacer shims 24.

A yet further feature of the invention resides broadly in a tensioning device characterized by the fact that one of the major sides of the deformable parallelepiped solid consists of a single composite flexible strip 14, the other major side being constituted by three composite flexible strips 14 held parallel by the interposition of spacer shims 24.

An additional feature of the invention resides broadly in a tensioning device characterized by the fact that each of the major sides of the deformable parallelepiped solid is constituted by a pair of composite flexible strips 14 held parallel by the interposition of spacer shims 24.

Another additional feature of the invention resides broadly in a tensioning device characterized by the fact that one of the major sides of a deformable parallelepiped solid is constituted by a pair of composite flexible strips 14, the other major side being constituted by a set of three composite flexible strips 14, the composite flexible strips 14 of each of the major sides being held parallel to one another by the insertion of spacer shims 24.

Another additional feature of the invention resides broadly in a tensioning device characterized by the fact that each of the composite flexible strips 14 is constituted by a composite material having a modulus of elasticity in traction-compression equal to at least 30 GPa and not more than 220 GPa.

Another additional feature of the invention resides broadly in a tensioning device characterized by the fact that each of the composite flexible strips 14 is constituted by alternating multiple layers of thin sheets, made of metal or a flexible polymer material, and thin layers of elastomer compound to which they are intimately bonded.

Another additional feature of the invention resides broadly in a tensioning device characterized by the fact that each of the composite flexible strips 14 is made of a composite material including a polymer matrix reinforced with high-strength long fibers, the composite material having a modulus of elasticity in traction-compression equal to a maximum 150 GPa.

Another additional feature of the invention resides broadly in a tensioning device characterized by the fact that the polymer matrix of the composite material constituting the composite flexible strips 14 is a thermoplastic polymer such as a polyolefin, a polyimide, a polyamide or a polyester.

Another additional feature of the invention resides broadly in a tensioning device characterized by the fact that the polymer matrix of the composite material constituting the composite flexible strips 14 is a thermosetting polymer such as an epoxy resin, a phenol resin or a formo-phenol resin.

Another additional feature of the invention resides broadly in a tensioning device characterized by the fact that the modulus of elasticity in traction of the long reinforcement fibers of the polymer matrix of the composite material constituting the composite flexible strips 14 is between about 35 and about 400 GPa.

Another additional feature of the invention resides broadly in a tensioning device characterized by the fact that the long reinforcement fibers of the polymer matrix of the composite material constituting the flexible strips 14 are high-strength textiles, such as polyvinyl alcohol, aramid, glass fibers or hybrid fibers.

Another additional feature of the invention resides broadly in a tensioning device characterized by the fact that the long reinforcement fibers of the polymer matrix of the composite material constituting the composite flexible strips 14 are metal wires or fibers.

Another additional feature of the invention resides broadly in a tensioning device characterized by the fact that the volume proportion of the reinforcing fibers, in relation to the total amount of the composite material, is between about 40% and about 80% and preferably between about 60% and about 70%.

Another additional feature of the invention resides broadly in a tensioning device characterized by the fact that the monodirectional orientation of the long reinforcement fibers of the polymer matrix of the composite material constituting the composite flexible strips 14 is between about $-8$ degrees and about $+8$ degrees, and preferably between about $-5$ degrees and about $+5$ degrees in relation to the longitudinal axis of the composite flexible strips 14.

Another additional feature of the invention resides broadly in a tensioning device characterized by the fact that the composite material constituting the composite flexible strips has an epoxy resin matrix reinforced by long glass fibers, the volume proportion of which is between 60% and 70% of the total volume of the composite material.

Another additional feature of the invention resides broadly in a tensioning device characterized by the fact that a damping elastomer layer 18 between strips is inserted between two composite flexible strips 14 of at least one of the major sides of the deformable parallelepiped solid, to give the elastic tension device 8 an effect of damping the vibrations of the flexible link 1.

Another additional feature of the invention resides broadly in a tensioning device characterized by the fact that the layer 18 between strips is intimately bonded to the composite flexible strips 14 which surround it.

Another additional feature of the invention resides broadly in a tensioning device characterized by the fact that the damping elastomer compound of the layer 18 between strips gives the elastic tension device 8 a rate of visco-elastic damping between 7% and 16% of the critical damping.

Another additional feature of the invention resides broadly in a tensioning device characterized by the fact that a compression prestress is imposed on the damping elastomer compound of the layer 18 between strips by utilization of a set of spacers 16 having a thickness less than that of the layer 18 between strips when it is in the free state, the compression prestress contributing an additional hysteresis effect to the damping of the elastic tension device 8.

Another additional feature of the invention resides broadly in a tensioning device characterized by the fact that integrated into the deformable parallelepiped solid is a means for damping the vibrations of the flexible link 1, consisting of an elastomer block 15 occupying at least a portion of the volume provided between the composite flexible strips which surround it.

Another additional feature of the invention resides broadly in a tensioning device characterized by the fact that the elastomer block 15 occupies all of the volume provided between the composite flexible strips 14 which surround it.

Another additional feature of the invention resides broadly in a tensioning device characterized by the fact that the elastomer block 15 which occupies all of the volume provided between the composite flexible strips 14 which surround it is intimately bonded to the composite flexible strips 14.

Another additional feature of the invention resides broadly in a tensioning device characterized by the fact that the elastomer block 15 partly occupies the volume provided between the composite flexible strips 14 to which it is intimately bonded over the contact zones.

Another additional feature of the invention resides broadly in a tensioning device characterized by the fact that it includes a means to modify, over a portion of the elastic travel, the flexibility of the elastic tension device 8.

Another additional feature of the invention resides broadly in a tensioning device characterized by the fact that the means to modify, over a portion of the elastic travel, the flexibility of the elastic tension device 8 is constituted by a mechanical flexibility limitation stop 10 located on the adjustable fastener 11 on the engine crankcase.

Another additional feature of the invention resides broadly in a tensioning device characterized by the fact that the mechanical flexibility limitation stop 10 located on the adjustable fastener 11 is placed inside the deformable parallelepiped solid, and its entry into contact occurs on the internal surface of a flexible composite strip 14.

Another additional feature of the invention resides broadly in a tensioning device characterized by the fact that the mechanical flexibility limitation stop 10 located on the adjustable fastener 11 is placed externally on the deformable parallelepiped solid, and its entry into contact occurs on the external surface of a composite flexible strip 14.

Another additional feature of the invention resides broadly in a tensioning device characterized by the fact that the means to modify, over a portion of the elastic travel, the flexibility of the elastic tension device 8 is constituted by a mechanical flexibility correction stop 10' associated with an opposite element 20 against which its entry into contact occurs, located inside the deformable parallelepiped solid, the mechanical flexibility correction stop 10' being supported by the adjustable fastener 11, the opposite element 20 being supported by the bearing holder block 12.

Another additional feature of the invention resides broadly in a tensioning device characterized by the fact that the mechanical flexibility correction stop 10' and the opposite element 20 are made of the composite material constituting the composite flexible strips 14.

Another additional feature of the invention resides broadly in a tensioning device characterized by the fact that the means to modify, over a portion of the elastic travel, the flexibility of the elastic tension device 8 consists of a length of cable 21 whose extremities are clamped or embedded in the constituent material(s) of the bearing holder block 12 and of the adjustable fastener 11, and the application of tension to the length of cable 21 causes an increase in the elastic recall rigidity of the elastic tension device 8.

Another additional feature of the invention resides broadly in a tensioning device characterized by the fact that the length of cable 21 is constituted by textile fibers such as polyamide, polyester, aramid or polyvinyl alcohol fiber.

Another additional feature of the invention resides broadly in a tensioning device characterized by the fact that the length of cable 21 is constituted by a metal wire or cable.

Another additional feature of the invention resides broadly in a tensioning device characterized by the fact that the means of modifying, over a portion of the elastic travel, the flexibility of the elastic tension device 8' is constituted by an oblique flexible strip 23 inserted into the deformable parallelepiped solid, at least two of whose extremities are connected by semi-embedded articulations, the extremities of the oblique flexible strip 23 being connected in a similar fashion, and its function being to reduce the rigidity of the elastic tension device 8' by shortening its center-to-center distance.

Another additional feature of the invention resides broadly in a tensioning device characterized by the fact that the semi-embedded articulations of the deformable parallelepiped solid are constituted by a local reduction of the thickness 22 over the entire width of the composite flexible strips 14, acting as a relatively flexible hinge.

Another additional feature of the invention resides broadly in a tensioning device characterized by the fact that each composite flexible strip 14 constituting one major side of the deformable parallelepiped solid has a constant thickness over its entire width.

Another additional feature of the invention resides broadly in a tensioning device characterized by the fact that at least one composite flexible strip 14v constituting one major side of the deformable parallelepiped solid, is of variable thickness, the thinner portion preferably being located in the central zone.

Another additional feature of the invention resides broadly in a tensioning device characterized by the fact that the fastening of the components is performed by a clamping, ensuring the fixing of one of the movable end A or the fixed end B, the one enclosing the bearing holder block 12, and the other the adjustable fastener 11, obtained by the clamping of a rectangular collar 25.

Another additional feature of the invention resides broadly in a tensioning device characterized by the fact that the fastening of the components is achieved by a clamping ensuring the fixing of either the movable end A or the fixed end B, the one enclosing the bearing holder block 12 and the other the adjustable fastener 11, obtained by two surrounding bolts 26 with a clamping plate 27.

Another additional feature of the invention resides broadly in a tensioning device characterized by the fact that the fastening of the components is accomplished by a clamping ensuring the fixing of either the movable end A or the fixed end B, the one enclosing the bearing holder block 12 and the other the adjustable fastening 11, obtained by structural gluing of the components.

Another additional feature of the invention resides broadly in a tensioning device characterized by the fact that the fastening of the components is realized by integration of the extremities of unjoined rings 14a and 14b during the molding of the polymer material constituting the bearing holder block 12 or the mechanical flexibility limitation stop 10, thereby ensuring the fixing of either the movable extremity A or the fixed extremity B.

Another additional feature of the invention resides broadly in a tensioning device characterized by the fact that the fastening of the components is realized by integration of one of the sides of the closed rings 14c, 14d during the molding of the polymer material constituting the bearing holder block 12 or the mechanical flexibility limitation stop 10, thereby ensuring the fixing of either the movable extremity A or the fixed extremity B.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into the specification.

The invention as described hereinabove in the context of the preferred embodiments is not to be taken as limited to all of the provided details thereof, since modifications and variations thereof may be made without departing from the spirit and scope of the invention.

What is claimed is:

1. An internal combustion engine comprising:

mechanical power generating means for generating mechanical power;

first wheel device being connected to and receiving mechanical power from said mechanical power generating means;

second wheel device positioned in spaced apart relation to said first wheel device, said second wheel device being connected to and receiving at least a portion of said mechanical power from said first wheel device;

belt means having a surface, said belt means being connected between said first wheel device and said second wheel device for transferring mechanical power from said first wheel device to said second wheel device by mechanical friction;

belt tensioning means for being in contact with said surface of said belt means for adjusting the tension of said belt means by applying a controlled amount of force to said surface of said belt means, said belt tensioning means comprising:

mounting means for being mounted on a first surface, said mounting means for supporting said belt tensioning means;

resilient member means connected to said mounting means;

movable member means connected to said resilient member means, said movable member means for being in contact with said belt means, said movable member means being movable relative to said mounting means to alter the tension of said belt means;

said movable member means comprising means for applying pressure to said belt means;

said resilient member means for receiving a rocking force and applying a rocking counter force between said mounting means and said movable member means when said movable member means is moved relative to said mounting means; and said resilient member means comprising at least two flexible arms, said at least two flexible arms being spaced apart from one another.

2. The internal combustion engine according to claim 1, wherein:

said at least two flexible arms are substantially parallel; and each of said at least two flexible arms comprises a first end and a second end, the first end of each of said at least two flexible arms for being substantially rigidly connected to the movable member means, and the second end of each of said at least two flexible arms for being substantially rigidly connected to said mounting means.

3. The internal combustion engine according to claim 2 wherein said at least two flexible arms define an interior space therebetween, and the interior space is at least partially filled with elastomer material to provide damping of vibrations of said belt means.

4. The internal combustion engine according to claim 3, wherein said at least two flexible arms comprise composite material having a modulus of elasticity in a range of about 30 GPa to about 220 GPa;

said means for applying pressure to said belt means comprises a pulley; and at least one of said at least two flexible arms comprises at least a pair of flexible arms spaced apart and parallel to one another.

5. A belt tensioning device for tensioning a belt of a power transmission device, said belt tensioning device for being in contact with a surface of a belt for adjusting the tension of the belt by applying a force to a first surface of the belt, said belt tensioning device comprising:

mounting means for being mounted on a first surface, said mounting means for supporting said belt tensioning device;

resilient member means connected to said mounting means;

movable member means connected to said resilient member means, said movable member means for being in contact with said belt means, said movable member means being movable relative to said mounting means to alter the tension of said belt means;

said movable member means comprising means for applying pressure to said belt means;

said resilient member means for receiving a rocking force and applying a rocking counter force between said mounting means and said movable member means when said movable member means is moved relative to said mounting means; and said resilient member means comprising at least two flexible arms, said at least two flexible arms being spaced apart from one another.

6. The tensioning device according to claim 5, wherein:
said at least two flexible arms are substantially parallel; and
each of said at least two flexible arms comprises a first end and a second end, the first end of each of said at least two flexible arms for being substantially rigidly connected to the movable member means, and the second end of each of said at least two flexible arms for being substantially rigidly connected to said mounting means.

7. The tensioning device according to claim 6, wherein each of said at least two flexible arms comprises at least one flexible strip, said at least one flexible strip comprising at least one of:
a metal; and
a composite material having a modulus of elasticity of between about 30 GPa to about 220 GPa.

8. The tensioning device according to claim 7, wherein:
at least one of said at least two flexible arms comprises a set of a plurality of flexible strips;
each of said flexible strips of said set of flexible strips being spaced apart from and parallel to one another; and
said flexible strips of said set of flexible strips being spaced apart by spacer means disposed between at least the first end and the second of the flexible strips.

9. The tensioning device according to claim 8, wherein at least one said set of flexible strips comprises at least one elastomer layer disposed between two adjacent flexible strips of the plurality of flexible strips of the set, said elastomer layer being at least one of:
unbonded to said two adjacent flexible strips;
bonded to at least one of said two adjacent flexible strips; and
bonded to both of said two adjacent flexible strips.

10. The tensioning device according to claim 9, wherein said flexible strips define a longitudinal axis, said spacer means has a thickness, said at least one elastomer layer has a thickness, and said thickness of said spacer means is less than said thickness of said at least one elastomer layer, the elastomer thereby being compressed upon formation of the flexible arms.

11. The tensioning device according to claim 10, wherein said composite material comprises a polymer matrix and reinforcement fibers in a predetermined proportion and a predetermined monodirectional orientation.

12. The tensioning device according to claim 11, wherein:
said polymer matrix comprises at least one of:
thermoplastic polymer, and
thermosetting polymer;
the thermoplastic polymer comprises at least one of:
polyolefin,
polyimide,
polyamide, and
polyester;
the thermosetting polymer comprises at least one of:
epoxy resin,
phenol resin, and
formo-phenol resin;
said reinforcement fibers comprise at least one of:
high strength textiles,
metal wires, and
metal fibers; and
the high strength textiles comprise at least one of:
polyvinyl alcohol,
aramid,
glass fibers, and
hybrid fibers.

13. The tensioning device according to claim 12, wherein:
said reinforcement fibers have a modulus of elasticity of between about 35 GPa and about 400 GPa;
said predetermined proportion of reinforcement fibers to polymer matrix is about 40 vol. % to about 80 vol. % and preferably 60 vol. % to about 70 vol. %; and
said predetermined monodirectional orientation of reinforcement fibers is between about $-8°$ to about $+8°$, and preferably between about $-5°$ to about $+5°$ in relation to the longitudinal axis of the flexible strips.

14. The tensioning device according to claim 13, further including an elastomer block disposed between said at least two flexible arms;
said at least two flexible arms defining an interior space; and
said elastomer block being configured to occupy at least a portion to the interior space.

15. The tensioning device according to claim 14, wherein said elastomer block is intimately bonded to at least one of said at least two flexible arms when said elastomer block occupies only a portion of the interior space, and said elastomer block is at least one of:
unbonded and bonded to said at least two flexible arms when said elastomer block occupies the entire interior space.

16. The tensioning device according to claim 15, further including flexibility modifying means for modifying the flexibility of the tensioning device, said flexibility modifying means comprising at least one of:
mechanical limiting stop means disposed adjacent at least one of said at least two flexible arms, said mechanical limiting stop for contacting said at least one of said at least two flexible arms upon said at least one of said at least two flexible arms moving a predetermined distance;
mechanical correction stop means disposed in the interior space of said tensioning device, said mechanical correction stop means comprising a first projection extending from said mounting means and a second projection extending from said movable member means, said first projection for contacting said second projection upon movement of said movable member means a predetermined distance;
a tensioning cable disposed within the interior space of said tensioning device, the tensioning cable having a first end attached adjacent to said mounting means adjacent a first of said at least two flexible arms, and a second end attached adjacent to said movable member means adjacent a second of said at least two flexible arms; and
an additional strip disposed obliquely within said interior space of said tensioning device, said additional strip having a first end attached adjacent to said mounting means adjacent a first of said at least two flexible arms, and a second end attached adjacent to said movable member means adjacent a second of said at least two flexible arms.

17. The tensioning device according to claim 16, wherein:
said mechanical limiting stop is at least one of:
disposed substantially within said interior space for contacting an inner surface of said at least one of said at least two flexible arms, and
disposed substantially exterior to said at least one of said at least two flexible arms for contacting an exterior surface of said at least one of said at least two flexible arms;
said mechanical correcting stop comprises substantially the same composite material as the flexible strips; and
said cable comprises at least one of:
textile fiber,
metal wire, and
metal cable.

18. The tensioning device according to claim 17, wherein said at least two flexible arms have a thickness, a length, and a central portion disposed along the length, the thickness of each of said at least two flexible arms being at least one of:
constant along the length of the flexible arm, and
variable along the length of the flexible arm.

19. The tensioning device according to claim 16, wherein said tensioning device with said additional oblique strip disposed within said interior space of said tensioning device includes articulation means for connecting at least one of:
at least one of said at least two flexible arms to said movable member means;
at least one of said at least two flexible arms to said mounting means;
said first end of said additional oblique strip to said mounting means; and
said second end of said additional oblique strip to said movable member means; and
said articulation means comprise a thickness, the thickness of said articulation means being less than the thickness of the flexible arms.

20. The tensioning device according to claim 6, wherein:
said at least two flexible arms are fastened at said second end to said movable member means by clamp means; and
said at least two flexible arms are fastened at said first end to said mounting means by clamp means.

21. The tensioning device according to claim 6, wherein two of said at least two flexible arms are formed by one of:

a single armature and two unjoined half-rings, wrapped substantially completely around both said mounting means and said movable member means;
said one of said single armature and said unjoined half-rings comprising a first end and a second end;
both of said first end and said second end of said one of said single armature and said unjoined half-rings being disposed adjacent one of:
said mounting means, and
said movable member means;
said one of said single armature and said unjoined half-rings being integrally molded to one of said movable member means and said mounting means during formation of said tensioning device.

22. The tensioning device according to claim 9, wherein:
said composite material having reinforcement fibers has a maximum modulus of elasticity of about 150 GPa;
said composite material comprises a polymer resin reinforced by reinforcement fibers, the reinforcement fibers comprising between about 40 vol. % to about 80 vol. % and preferably between about 60 vol. % to about 70 vol. % of the composite material; and
said tensioning device has a critical damping and said elastomer compound disposed between adjacent strips of a set of strips provides a damping rate between about 7% to about 16% of the critical damping.

23. The tensioning device according to claim 8, wherein:
the at least two flexible arms comprise two flexible arms disposed substantially parallel to and spaced apart from one another; and
the configuration of said two flexible arms comprise one of:
both of said two flexible arms comprise a single flexible strip;
one of said two flexible arms comprises a single flexible strip and the other of said two flexible arms comprises two spaced apart flexible strips;
both of said two flexible arms comprise two spaced apart flexible strips;
one of said two flexible arms comprises a single flexible strip and the other of said two flexible arms comprises three spaced apart flexible strips;
one of said two flexible arms comprises two spaced apart flexible strips and the other of said two flexible arms comprises three spaced apart flexible strips; and
both of said two flexible arms comprise three spaced apart flexible strips;
depending on the amount of tensioning required for the belt of the power transmission device.

* * * * *